United States Patent
Pal et al.

(10) Patent No.: US 11,146,439 B2
(45) Date of Patent: Oct. 12, 2021

(54) ROBUST CARRIER PHASE AND FREQUENCY TRACKING FOR M-QAM DEMODULATION

(71) Applicant: National Instruments Corporation, Austin, TX (US)

(72) Inventors: Prabhat Pal, Bangalore (IN); Aayush Verma, Bangalore (IN)

(73) Assignee: National Instruments Corporation, Austin, TX (US)

( * ) Notice: Subject to any disclaimer, the term of this patent is extended or adjusted under 35 U.S.C. 154(b) by 1 day.

(21) Appl. No.: 16/703,807

(22) Filed: Dec. 4, 2019

(65) Prior Publication Data
US 2021/0176109 A1    Jun. 10, 2021

(51) Int. Cl.
*H04L 27/26* (2006.01)

(52) U.S. Cl.
CPC ...... *H04L 27/2659* (2013.01); *H04L 27/2672* (2013.01); *H04L 27/2679* (2013.01); *H04L 27/2684* (2013.01); *H04L 27/2695* (2013.01)

(58) Field of Classification Search
CPC ............. H04L 27/2659; H04L 27/2684; H04L 27/2679; H04L 27/2672
See application file for complete search history.

(56) References Cited

U.S. PATENT DOCUMENTS

| | | | | |
|---|---|---|---|---|
| 5,875,213 A * | 2/1999 | Asami | ...................... | H04L 1/24 329/300 |
| 2004/0091058 A1* | 5/2004 | Tosato | .................... | H04L 27/38 375/261 |
| 2011/0182387 A1* | 7/2011 | Ahmed | ............... | H04L 27/0014 375/344 |
| 2013/0216005 A1* | 8/2013 | Chaudhary | ......... | H04L 27/2331 375/324 |

(Continued)

OTHER PUBLICATIONS

Inoue, Takashi et al. "Carrier Recovery for M-QAM Signals Based on a Block Estimation Process with Kalman Filter." National Institute of Advanced Industrial Science and Technology (AIST) Ibaraki, Japan. Published Jun. 17, 2014, vol. 22, No. 13. Optics Express. pp. 15376-15387.

*Primary Examiner* — Gregory B Sefcheck
*Assistant Examiner* — Debebe A Asefa
(74) *Attorney, Agent, or Firm* — E. Alan Davis; James W. Huffman

(57) ABSTRACT

A method for determining coarse carrier phase and frequency offsets of an initial block of received M-QAM symbols includes creating a grid of discrete candidate phase offset values and for each candidate value: applying the candidate value to each symbol, applying a respective hard decision to each applied symbol, and computing a figure of merit based thereon. The candidate value having the best figure of merit is selected as an initial phase offset estimate. An initial frequency offset estimate is computed using the symbols updated with the initial phase offset estimate, their (Continued)

respective hard decisions, and an approximation of the complex exponential function. To track carrier phase and frequency offsets associated with a series of symbol blocks, for each symbol of a current block, set a binary trust weight based on comparison of a computed parameter with a threshold and use the binary trust weights to compute a phase offset error and a frequency offset error for the current block.

20 Claims, 10 Drawing Sheets

(56) References Cited

U.S. PATENT DOCUMENTS

| | | | |
|---|---|---|---|
| 2013/0259113 A1* | 10/2013 | Kumar | H04L 25/03292 375/233 |
| 2015/0312078 A1* | 10/2015 | Bogdan | H03L 7/0995 375/226 |
| 2019/0123832 A1* | 4/2019 | Alic | H04L 27/3818 |

* cited by examiner

ROBUST CARRIER PHASE AND FREQUENCY TRACKING FOR M-QAM DEMODULATION

BACKGROUND

For reliable reception of transmitted data in digital communication systems using quadrature amplitude modulation (QAM) schemes, one of the critical signal processing blocks is an accurate carrier frequency offset estimator and tracker. Failure to either accurately provide a good initial estimate of carrier phase and/or frequency offset or to track slowly varying phase and/or frequency offset results in poor fidelity of receiving the transmitted bits. While many phase-locked loop (PLL) based and Kalman filter-based phase/frequency offset estimation and tracking algorithms have been proposed, they are typically highly sensitive to random noise and other sources of distortion.

BRIEF SUMMARY

Embodiments are described in which carrier phase offset and frequency offset estimation and tracking (e.g., Kalman filter-based) with initial state search and hard-decision trust algorithms for M-QAM modulated signals are employed.

In one aspect the present invention provides a method for determining coarse carrier phase and frequency offsets of an initial block of received symbols modulated using an M quadrature amplitude modulation (M-QAM) symbol map. The method includes creating a grid of discrete candidate phase offset values. The method also includes, for each candidate phase offset value in the grid: applying the candidate phase offset value to each of the M-QAM symbols, applying a respective hard decision from the symbol map to each of the candidate phase offset value-applied M-QAM symbols, and computing a figure of merit for the candidate phase offset value based on the candidate phase offset value-applied M-QAM symbols and their respective hard decisions. The method also includes selecting the discrete candidate phase offset value from the grid having the best figure of merit as an initial phase offset estimate. The method also includes computing an initial frequency offset estimate using the M-QAM symbols updated with the initial phase offset estimate, their respective hard decisions, and an approximation of the complex exponential function.

In another aspect the present invention provides a method for tracking carrier phase and frequency offsets associated with a series of blocks of received symbols modulated using an M quadrature amplitude modulation (M-QAM) symbol map. The method includes, for each M-QAM symbol of a current block, setting a binary trust weight for the M-QAM symbol based on comparison of a computed parameter with a threshold. The method also includes using the binary trust weights to compute a phase offset error and a frequency offset error associated with the current block. Each of the M-QAM symbols having a zero-valued binary trust weight is non-contributory in the computation of the phase and frequency offset errors.

In yet another aspect the present invention provides a non-transitory computer-readable medium having instructions stored thereon that when executed by a processor, cause the processor to perform operations of a method. The method is for determining coarse carrier phase and frequency offsets of an initial block of received symbols modulated using an M quadrature amplitude modulation (M-QAM) symbol map. The operations include creating a grid of discrete candidate phase offset values. The operations also include, for each candidate phase offset value in the grid: applying the candidate phase offset value to each of the M-QAM symbols, applying a respective hard decision from the symbol map to each of the candidate phase offset value-applied M-QAM symbols, and computing a figure of merit for the candidate phase offset value based on the candidate phase offset value-applied M-QAM symbols and their respective hard decisions. The operations also include selecting the discrete candidate phase offset value from the grid having the best figure of merit as an initial phase offset estimate. The operations also include computing an initial frequency offset estimate using the M-QAM symbols updated with the initial phase offset estimate, their respective hard decisions, and an approximation of the complex exponential function. Or, the method is for tracking carrier phase and frequency offsets associated with a series of blocks of received symbols modulated using an M quadrature amplitude modulation (M-QAM) symbol map. The operations include for each M-QAM symbol of a current block, setting a binary trust weight for the M-QAM symbol based on comparison of a computed parameter with a threshold. The operations also include using the binary trust weights to compute a phase offset error and a frequency offset error associated with the current block. Each of the M-QAM symbols having a zero-valued binary trust weight is non-contributory in the computation of the phase and frequency offset errors.

DETAILED DESCRIPTION OF THE EMBODIMENTS

Figure 1:
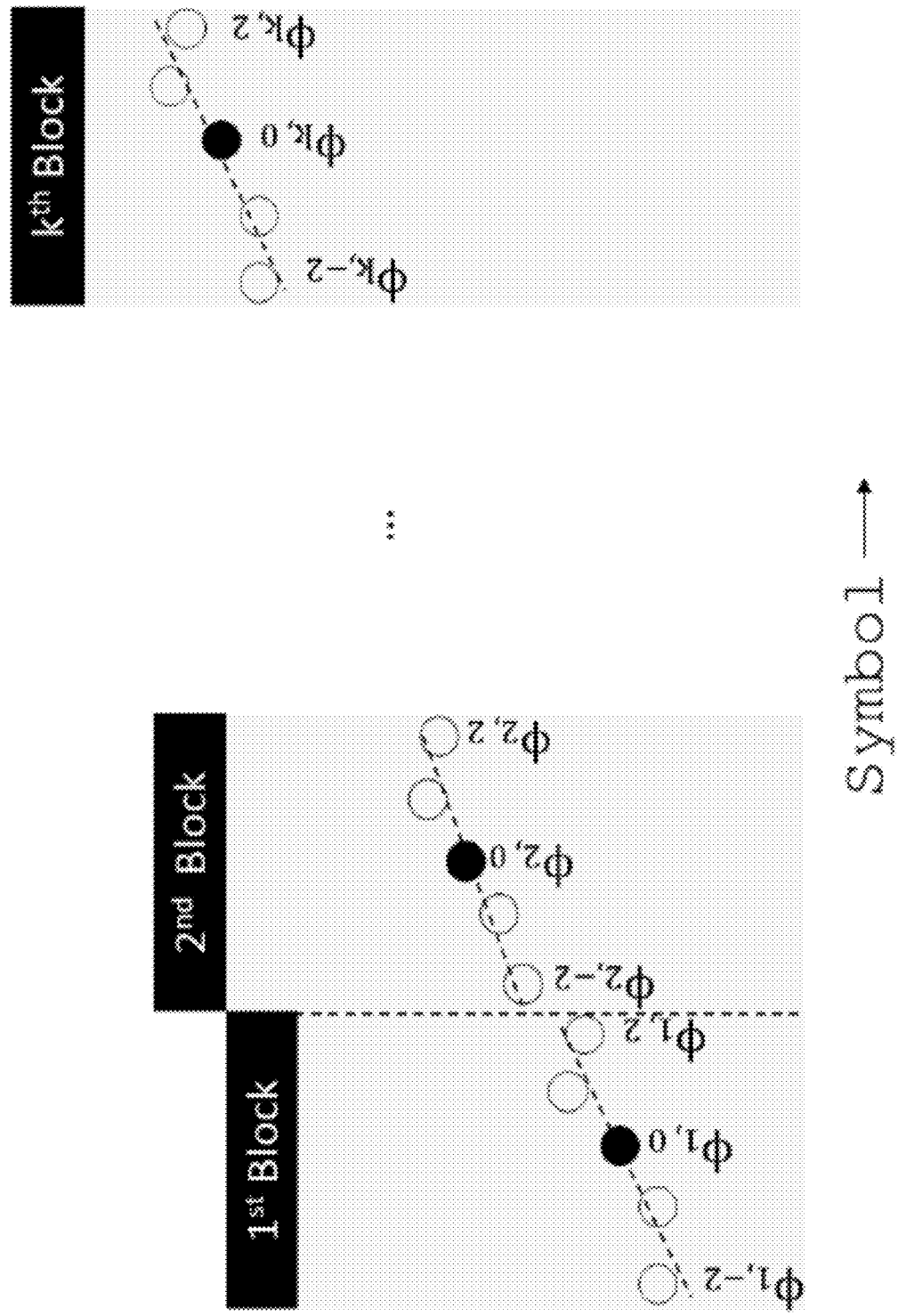
FIG. 1 is a diagram illustrating carrier phase offset for each symbol in each received block of symbols.

Generally, the success of a phase/frequency offset tracker is contingent upon having a good initial estimate of the carrier phase offset and frequency offset of the received signal. A poor initial estimate, as seen in many conventional solutions, typically results in complete failure of the phase/frequency offset tracking algorithms. Embodiments are described of an initial phase/frequency offset estimation method that ensures the tracking algorithms following the initial state estimator work reliably even under noisy conditions. This is achieved by performing a suitable grid search for initial phase estimation that ensures that most hard decisions on the symbols in the first block are correct.

Additionally, the carrier phase/frequency offset tracking algorithm of the described embodiments is much more robust against random noise in the received QAM modulated signal. The phase tracker achieves the robustness by incorporating a binary trust-factor of either 0 or 1 for each received symbol in the block of QAM symbols being used for estimating the updated value of the carrier phase offset and frequency offset.

For efficient computation of closed form solutions of the phase/frequency offset parameters, a complex exponential function is approximated as a cubic polynomial for a domain that is restricted to a set of pre-determined values determined by the M-QAM scheme which depends on the maximum supported carrier frequency offset for the M-QAM symbol map. The maximum supported carrier frequency offset for the M-QAM symbol map is dependent upon the number of symbols in a block. Embodiments use a cubic approximation of the complex exponential by restricting the domain of the complex exponential to pre-determined values based on the maximum supported carrier frequency offset for a given modulation scheme. The approach to cubic approximation by exploiting the knowledge of the supported domain of the approximated function results in a much lower approximation error than, for example, using a third order Taylor series approximation (see FIG. 7). The derivative of the resultant cubic is a quadratic that has an efficient closed form solution, as described in more detail below, e.g., with respect to Derivation 2.

To aid the in the description of the embodiments described herein, a signal model will now be developed that is similar to the formulation by Takashi Inoue and Shu Namiki, "Carrier recovery for M-QAM signals based on a block estimation process with Kalman filter." Optics express 22.13 (2014): 15376-15387.

Let the received symbols be modeled per equation (1) (ignoring noise and other distortion).

$$r_{k,n} = s_{k,n} \exp j\phi_{k,n} \quad (1)$$

In equation (1), $r_{k,n}$ is the $n^{th}$ received symbol in the $k^{th}$ block, where $n \in [-L, L]$, and the number of symbols in a block is $2L+1$; $s_{k,n}$ is the corresponding transmitted clean symbol; and $\phi_{k,n}$ is the phase rotation in the received symbol, relative to the ideal position of the symbol. In the present disclosure, generally when expressing ranges of numbers, the notation [A, B] denotes the set of all numbers between A and B, including A and B as well; (A, B] denotes the set of all numbers between A and B, excluding A but including B; [A, B) denotes the set of all numbers between A and B, including A but excluding B; and (A, B) denotes the set of all numbers between A and B, excluding A and B.] Equation (2) expresses the phase rotation in the received symbol. In the present disclosure, the units of phase, $\theta$, and frequency, $\omega$, terms, when used as a part of the argument of a complex exponential have units of radian and radians per symbol, respectively, unless otherwise specified.

$$\phi_{k,n} = \theta_k + n\omega_k; n \in [-L, L] \quad (2)$$

K+1 is the total number of blocks. FIG. 1 is a diagram illustrating carrier phase offset for each symbol in each received block of symbols. In FIG. 1, L=2, and a block of symbols consists of $2L+1=5$ QAM symbols. The symbols are grouped into blocks, denoted $1^{st}$ Block, $2^{nd}$ Block through $k^{th}$ Block. FIG. 1 shows an example of carrier phase for each received symbol.

Assume that from one block to the next, the phase offset $\theta_k$ and frequency offset $\omega_k$ associated with the block k evolves according to equation (3A):

$$\begin{bmatrix} \theta_{k+1} \\ \omega_{k+1} \end{bmatrix} = \begin{bmatrix} 1 & 2L+1 \\ 0 & 1 \end{bmatrix} \begin{bmatrix} \theta_k \\ \omega_k \end{bmatrix} + \begin{bmatrix} 0 \\ n_f \end{bmatrix} \quad (3A)$$

where $n_f$ is random phase noise and models slow variation of frequency offset over received blocks of symbols.

Equivalently, in terms of matrix variables, the state evolves according to equation (3B):

$$x_{k+1} = F x_k + n_S \quad (3B)$$

where $$x_k \triangleq \begin{bmatrix} \theta_k \\ \omega_k \end{bmatrix}, \quad (3C)$$

$$F \triangleq \begin{bmatrix} 1 & 2L+1 \\ 0 & 1 \end{bmatrix}, \quad (3D)$$

and $$n_s = \begin{bmatrix} 0 \\ n_f \end{bmatrix}. \quad (3E)$$

The state evolution model in equation (3) assumes that blocks are non-overlapping. For tracking fast changes in the phase-frequency offset state, the evolution model can be changed as according to equation (4A):

$$\begin{bmatrix} \theta_{k+1} \\ \omega_{k+1} \end{bmatrix} = \begin{bmatrix} 1 & 2V-1 \\ 0 & 1 \end{bmatrix} \begin{bmatrix} \theta_k \\ \omega_k \end{bmatrix} + \begin{bmatrix} 0 \\ n_f \end{bmatrix}; V \in [1, L+1] \quad (4A)$$

Equivalently, in terms of matrix variables, the state evolves according to equation (4B):

$$x_{k+1} = F x_k + n_S \quad (4B)$$

where, the matrix F is re-defined according to equation (4C):

$$F = \begin{bmatrix} 1 & 2V-1 \\ 0 & 1 \end{bmatrix} \quad (4C)$$

Figure 2:
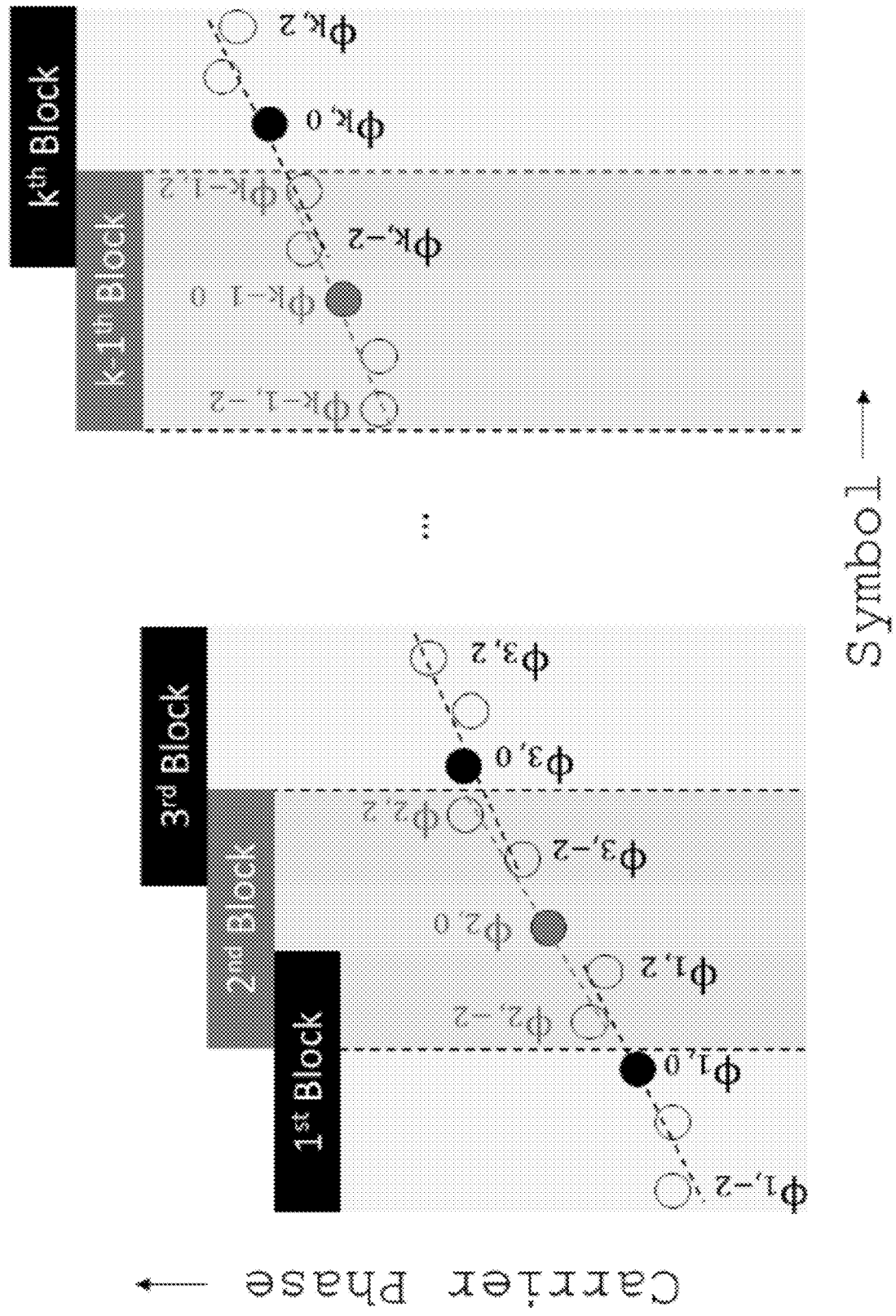
FIG. 2 is a diagram illustrating carrier phase offset for each symbol in each received block of symbols with overlapping parameter V equal 2.

The value assigned to V controls the number of overlapping symbols in consecutive blocks. For example, setting V=L+1 means consecutive blocks have no overlap. On the other extreme, V=1 means that L symbols are common between two consecutive blocks. FIG. 2 shows the carrier phase for received symbols grouped in overlapping blocks with L=2 and V=2.

Let the noisy observations of the state vector $x_k$ be $y_k$ such that:

$$y_k = x_k + n_o \quad (5A)$$

with $$y_k = \begin{bmatrix} \tilde{\theta}_k \\ \tilde{\omega}_k \end{bmatrix}, n_o = \begin{bmatrix} n_\theta \\ n_\omega \end{bmatrix} \quad (5B)$$

Figure 3A:
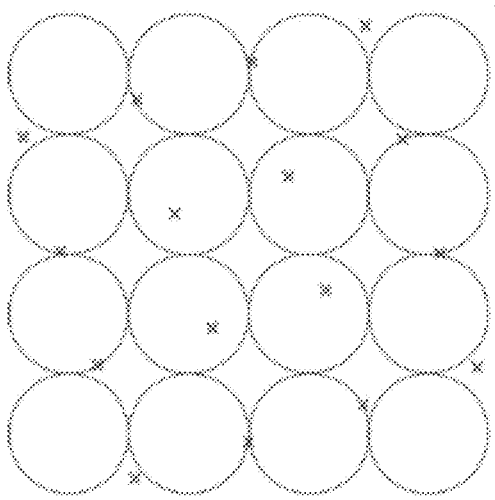
FIGS. 3A, 3B and 3C, referred to collectively as FIG. 3, are constellation diagrams illustrating examples of an upper limit of phase offset for correct hard decision for 16-QAM symbols.
Figure 3B:
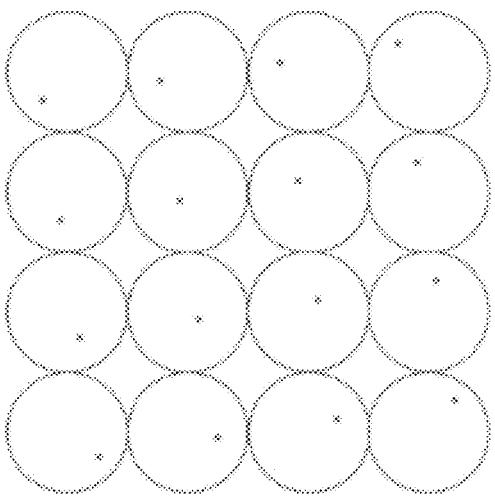
Figure 3C:
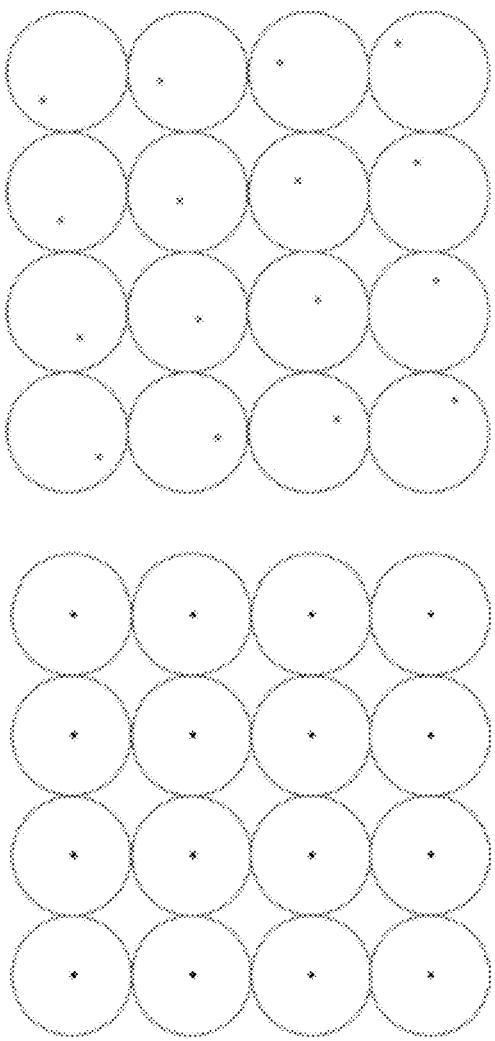

Referring now to FIGS. 3A, 3B and 3C, referred to collectively as FIG. 3, constellation diagrams illustrating examples of an upper limit of phase offset for correct hard decision for 16-QAM symbols are shown. Embodiments are described herein for a method of tracking the carrier phase and frequency offsets that is decision-directed. Hard decisions on a received symbol for a given M-QAM modulation are only correct if the carrier phase offset for the symbol is less than an upper bound. FIG. 3 illustrates the hard decision for a 16-QAM constellation. FIG. 3A shows a 16-QAM constellation with no phase offset. FIG. 3B shows the constellation rotated by 9 degrees, and hard decisions on these rotated symbols are still correct, as shown. FIG. 3C shows the constellation rotated by 18 degrees, and hard decisions on these symbols are incorrect, as shown. Table 1 lists the maximum tolerated phase offset, or phase rotation, of a QAM symbol for the hard decision to be correct for each of ten different M-QAM constellations, or symbol maps.

Figure 4:
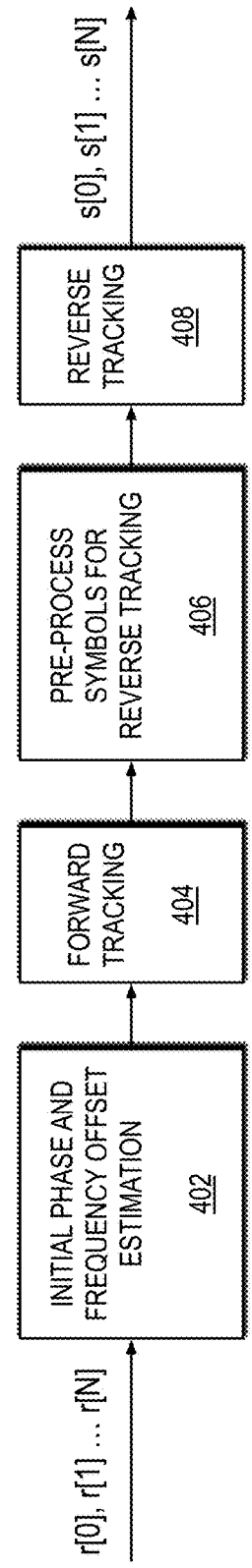
FIG. 4 is a flow diagram illustrating different stages of a carrier recovery method suitable for use in a radio frequency (RF) device.

Referring now to FIG. 4, a diagram illustrating different stages of a carrier recovery method suitable for use in a radio frequency (RF) device, such as a mobile user equipment device, base station or test instrument, is shown. The first stage 402 estimates a good initial estimate of the carrier phase and frequency offsets. The second stage 404 processes all received symbols in the forward direction. The third stage 406 computes the initial estimates in preparation for processing all the received QAM symbols in reverse chronological order. The last stage 408 processes the QAM symbols in reverse. The reverse processing ensures that any transient hard decision errors potentially manifested in the forward processing step are eliminated, leading to an error-free recovery of all symbols. Each of the stages is described in more detail below.

The first stage 402 processes the $0^{th}$ block of QAM symbols to obtain a good estimate of the carrier phase and frequency offsets for the block. The first stage 402 is described in pseudocode below as Algorithm 1. The embodiments use a cubic approximation of a complex exponential, as expressed in equation (6), $$e^{-j\omega n} \approx \alpha_0 + \alpha_1 \omega n + \alpha_2 \omega^2 n^2 + \alpha_3 \omega^3 n^3 \quad (6)$$

by restricting the domain of the complex exponential to pre-determined values based on the maximum supported carrier frequency offset for a given modulation scheme, such as shown in Table 1 above. Table 2 below lists, as an example, values of the polynomial coefficients of the cubic approximation of the complex exponential of equation (6) for different M-QAM constellations with block size of 17, i.e., L=8.

TABLE 2

| M-QAM | $\alpha_0$ | $\alpha_1$ | $\alpha_2$ | $\alpha_3$ |
|---|---|---|---|---|
| 4 | 0.9806 + j0.000 | 0.000 − j0.9891 | −0.4186 + j0.000 | 0.000 + j0.1453 |
| 8 | 0.9960 + j0.000 | 0.000 − j0.9977 | −0.4624 + j0.000 | 0.000 + j0.1569 |
| 16 | 0.9994 + j0.000 | 0.000 − j0.9997 | −0.4855 + j0.000 | 0.000 + j0.1629 |
| 32 | 0.9999 + j0.000 | 0.000 − j1.000 | −0.4945 + j0.000 | 0.000 + j0.1652 |
| 64 | 1.000 + j0.000 | 0.000 − j1.000 | −0.4975 + j0.000 | 0.000 + j0.1660 |
| 128 | 1.000 + j0.000 | 0.000 − j1.000 | −0.4989 + j0.000 | 0.000 + j0.1664 |
| 256 | 1.000 + j0.000 | 0.000 − j1.000 | −0.4994 + j0.000 | 0.000 + j0.1665 |
| 512 | 1.000 + j0.000 | 0.000 − j1.000 | −0.4997 + j0.000 | 0.000 + j0.1666 |
| 1024 | 1.000 + j0.000 | 0.000 − j1.000 | −0.4999 + j0.000 | 0.000 + j0.1666 |
| 2048 | 1.000 + j0.000 | 0.000 − j1.000 | −0.4997 + j0.000 | 0.000 + j0.1666 |
| 4096 | 1.000 + j0.000 | 0.000 − j1.000 | −0.5000 + j0.000 | 0.000 + j0.1666 |

TABLE 1

| M-QAM | $\theta_{MAX}$ (degrees) |
|---|---|
| 4 | 45 |
| 8 | 24 |
| 16 | 17 |
| 32 | 11 |
| 64 | 7.6 |
| 128 | 5.0 |
| 512 | 3.7 |
| 1024 | 2.4 |
| 2048 | 1.2 |
| 4096 | 0.9 |

Algorithm 1 performs estimation of phase and frequency offsets of the zeroth block of received symbols and may also be referred to as "Initial Phase and Frequency Offsets Estimation," where the term "Initial" indicates that the estimated quantities are for the zeroth block of received QAM symbols. Advantageously, Algorithm 1 discretizes candidate phase offset values, as described in more detail below, e.g., with respect to Derivation 1, which may reduce the computational intensity associated with estimating the initial phase and frequency offsets, i.e., the phase and frequency offset estimates for the zeroth block of M-QAM symbols. In the present disclosure, a quantity with a superscript "*" denotes the complex conjugate of a complex number. For example, $(2+j1)^* = 2-j1$, where j is equal to $\sqrt{-1}$.

ALGORITHM 1 - Initial Phase and Frequency Offsets Estimation

Inputs:
1. $0^{th}$ block of $2L + 1$ received noisy M-QAM symbols: $r_{0,-L}, \ldots, r_{0,0}, \ldots r_{0,+L}$

---

ALGORITHM 1 - Initial Phase and Frequency Offsets Estimation

---

2. Theoretical maximum phase offset range for error free hard decision on a QAM symbol assuming no frequency offset: $(-\theta_{MAX}, \theta_{MAX})$
3. Theoretical maximum frequency offset range assuming no phase offset:

$$(-\omega_{MAX}, \omega_{MAX}), \text{ where } \omega_{MAX} = \frac{\theta_{MAX}}{L}$$

4. Actual maximum frequency offset range assuming no phase offset:
   $(-f \times \omega_{MAX}, f \times \omega_{MAX}) : f \in (0, 1)$.
   In one embodiment, the value of f is 0.80, although other embodiments are contemplated in which f has a different value.

Outputs: Initial coarse estimates of carrier phase and frequency offsets, $x_0 = \begin{bmatrix} \theta_0 \\ \omega_0 \end{bmatrix}$ BEGIN
1. Search range for initial phase offset estimate for the $0^{th}$ block: $[-45°, 45°)$.
2. Set phase grid step size: $\Delta\theta \in (0, 2(1-f)\theta_{MAX}]$.
3. Create a grid of candidate phase offset values:
   $\theta(i) = -45 + \Delta\theta \times i : i \in \{0, 1, 2, \ldots, i_{LAST}\}$, $\theta(i) \in [-45°, 45°)$.
   Compute a figure of merit, g(i), for all candidate phase offset values $\theta(i)$ as follows:
   FOR All $i \in \{0, 1, 2, \ldots, i_{LAST}\}$
   Apply phase offset $-\theta(i)$ to all symbols in the block: $r_{0,n}(i) \leftarrow r_{0,n}e^{-j\theta(i)} : n \in [-L, +L]$
   Apply hard decision: $H(r_{0,n}) = h_n(i) : n \in [-L, +L]$ Compute RMS error metric: $g(i) = \sqrt{\dfrac{\sum_{n=-L}^{+L} |r_{0,n}(i) - h_n(i)|^2}{2L+1}}$ END FOR
4. Coarse initial phase offset estimate is the candidate phase with minimum RMS Error:
   $\theta_0 \leftarrow \theta(l) : g(l) = \min \{g(i)\}_{i=0}^{i_{LAST}}$.
5. Apply estimated coarse phase offset as $r_{0,n} \leftarrow r_{0,n}e^{-j\theta_0}$. Frequency offset estimate is:

$$\omega_0 \leftarrow -\frac{b}{2a} - \frac{\sqrt{b^2 - 4ac}}{2a},$$

where
$a \triangleq \text{Re } \Sigma_{n=-L}^{+L} 3n^3 r_{0,n} h_n^* \alpha_3$,
$b \triangleq \text{Re } \Sigma_{n=-L}^{+L} 2n^2 r_{0,n} h_n^* \alpha_2$,
$c \triangleq \text{Re } \Sigma_{n=-L}^{+L} n r_{0,n} h_n^* \alpha_1$ $\alpha_1 \triangleq \dfrac{15}{2} j\omega_{MAX}^{-2}(-21\omega_{MAX}^{-3}\sin\omega_{MAX} + 21\omega_{MAX}^{-2}\cos\omega_{MAX} + 8\omega_{MAX}^{-1}\sin\omega_{MAX} - \cos\omega_{MAX})$ $\alpha_2 \triangleq \dfrac{15}{2} \omega_{MAX}^{-3}(-3\omega_{MAX}^{-2}\sin\omega_{MAX} + 3\omega_{MAX}^{-1}\cos\omega_{MAX} + \sin\omega_{MAX})$ $\alpha_3 \triangleq \dfrac{35}{2} j\omega_{MAX}^{-4}(-15\omega_{MAX}^{-3}\sin\omega_{MAX} - 15\omega_{MAX}^{-2}\cos\omega_{MAX} - 6\omega_{MAX}^{-1}\sin\omega_{MAX} + \cos\omega_{MAX})$ 6. Refine the initial phase offset estimate: $\theta_0 \leftarrow \theta_0 + \arg(\Sigma_{n=-L}^{+L} r_{0,n} h_n^* e^{-j\omega_0 n})$.
END

---

Figure 6:
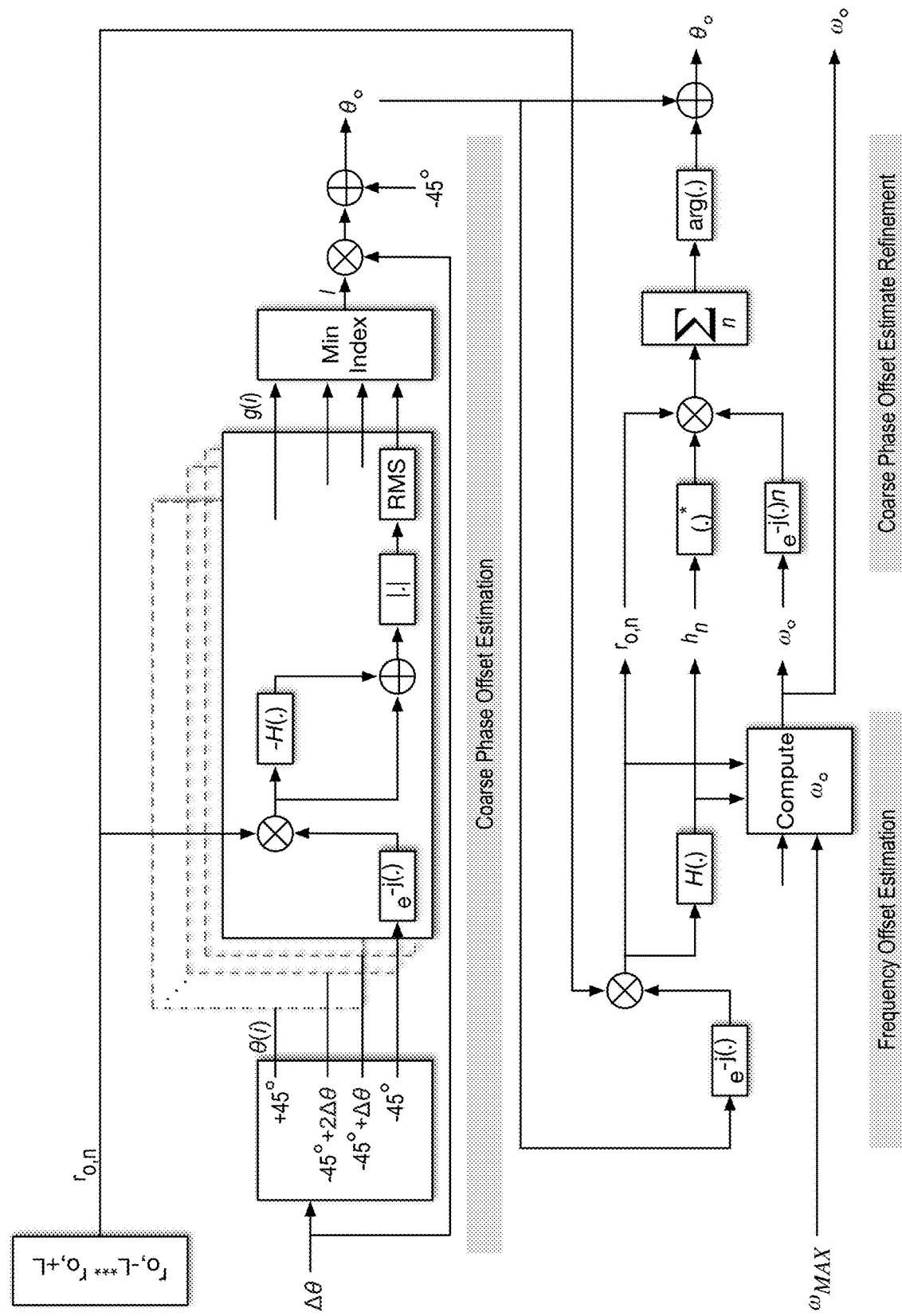
FIG. 6 is a block diagram illustrating estimation of phase and frequency offsets of the zeroth block of received symbols.

FIG. 6 is a block diagram illustrating estimation of phase and frequency offsets of the zeroth block of received symbols substantially as described above with respect to Algorithm 1. As shown, the zeroth block estimation includes determining coarse phase offset estimation (e.g., per steps 1-4 of Algorithm 1), frequency offset estimation (e.g., per step 5 of Algorithm 1), and coarse phase offset estimate refinement (e.g., per step 6 of Algorithm 1).

Figure 5:
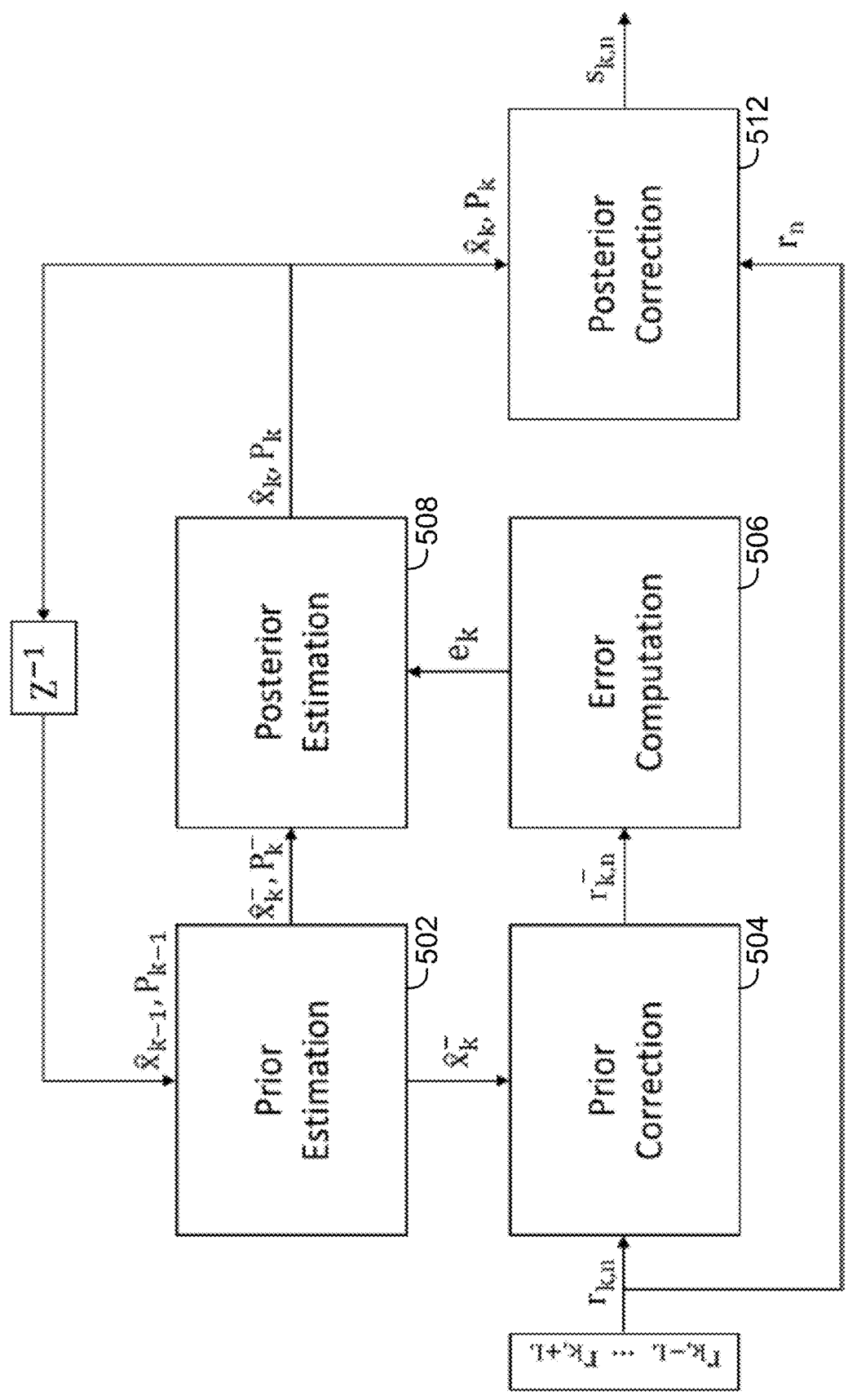
FIG. 5 is a flow diagram illustrating steps involved in Kalman filter-based carrier phase and frequency offset tracking.

The second stage 404, forward phase and frequency offset tracking, processes all the blocks of received QAM symbols in chronological order, performing Kalman filter-based carrier phase and frequency offset tracking in the forward direction. The second stage 404 is described in pseudocode below as Algorithm 2. The phase tracker in the second stage 404 incorporates a binary trust-factor of either 0 or 1, for each received symbol in the block of QAM symbols being used for estimating the updated values of the carrier phase and frequency offsets. FIG. 5 illustrates steps involved in Kalman filter-based carrier phase and frequency offset tracking. Steps 502, 504, 506 and 508 of FIG. 5 are described in more detail below with respect to Algorithm 2, and step 512 of FIG. 5 is described in more detail below with respect to Algorithm 4. In the present disclosure, a quantity with a superscript "−", e.g., $\theta_k^-$, denotes a quantity predicted from past observations.

| ALGORITHM 2 - Forward Phase and Frequency Offset Tracking |
|---|

Inputs:
1. $k^{th}$ block of received noisy QAM symbols: $r_{k,-L}, \ldots, r_{k,0}, \ldots r_{k,+L} : k \geq 1$ 2. Estimates of carrier phase and frequency offsets for $(k-1)^{th}$ block, $x_{k-1} = \begin{bmatrix} \theta_{k-1} \\ \omega_{k-1} \end{bmatrix}$, which when $k = 1$ is the initial coarse estimates of carrier phase and frequency offsets, $x_0 = \begin{bmatrix} \theta_0 \\ \omega_0 \end{bmatrix}$, obtained according to Algorithm 1.

3. Covariance Matrix $R$. In one embodiment, the value of $R$ is $\begin{bmatrix} 0.01 & 0 \\ 0 & 0.001 \end{bmatrix}$, although other embodiments are contemplated in which R has a different value.

4. Noise covariance matrix for $(k-1)^{th}$ block, $P_{k-1}$, which when $k = 1$ is the noise covariance matrix for the first block, $P_0$. In one embodiment, the value of $P_0$ is $\begin{bmatrix} 1 & 0 \\ 0 & 1 \end{bmatrix}$, although other embodiments are contemplated in which $P_0$ has a different value.

5. Hard decision trust threshold, $\Gamma \in [-\infty, 0]$. In one embodiment, the value of $\Gamma$ is $-5$ dB, although other embodiments are contemplated in which $\Gamma$ has a different value.

Outputs:
1. Change in phase and frequency offset estimates as relative to $(k-1)^{th}$ block of symbols: $\delta\theta_k, \delta\omega_k$
2. Updated phase and frequency offset estimates for the $k^{th}$ block of symbols: $\theta_k, \omega_k$ BEGIN
1. Predict prior estimation of the phase and frequency offsets for $k^{th}$ block (Step 502 of FIG. 5) using estimates for $(k-1)^{th}$ block as:
   $\theta_k^- = \theta_{k-1} + (2V - 1)\omega_{k-1}$
   $\omega_k^- = \omega_{k-1}$
   where $V \in [1, L + 1]$ controls the amount of overlap in consecutive blocks of symbols.
   In matrix notation, this can be written as:
   $x_k^- = Fx_{k-1}$
   where $$x_k^- \triangleq \begin{bmatrix} \theta_k^- \\ \omega_k^- \end{bmatrix}, x_{k-1} \triangleq \begin{bmatrix} \theta_{k-1} \\ \omega_{k-1} \end{bmatrix}, F \triangleq \begin{bmatrix} 1 & 2V - 1 \\ 0 & 1 \end{bmatrix}$$

2. Perform prior correction on the symbols in the $k^{th}$ block (Step 504 of FIG. 5), using the estimated phase and frequency offset values.
   $r_{k,n}^- = r_{k,n} \exp -j(\theta_k^- + n\omega_k^-) : n \in [-L, L]$ 3. Set hard decision trust weights (Step 506 of FIG. 5)
   a. For each symbol in the block, make a hard decision after prior correction: $h_{k,n}^- = H(r_{k,n}^-)$. That is, $h_{k,n}^-$ is the ideal symbol on the symbol map closest to $r_{k,n}^-$.
   b. For each symbol in the block, find the ideal symbol on the symbol map closest to the received symbol other than $h_{k,n}^-$. Denote the found symbol as $d_{k,n}^-$. That is, $d_{k,n}^-$ is the ideal symbol second closest to $r_{k,n}^-$, the closest being $h_{k,n}^-$.

c. Compute the ratio of Euclidian distances: $\gamma_{k,n} = \dfrac{|r_{k,n}^- - h_{k,n}^-|}{|r_{k,n}^- - d_{k,n}^-|} \in [0, 1]$ d. Compute threshold parameter for all symbols $\beta_{k,n} \triangleq 20 \log(1 - \gamma_{k,n}) \in [-\infty, 0]$
   e. Set binary hard decision trust weights for all symbols $$\rho_{k,n} = \begin{cases} 0, & \beta_{k,n} < \Gamma \\ 1, & \beta_{k,n} \geq \Gamma \end{cases}$$

The binary trust weights may advantageously operate to effectively exclude untrusted symbols (i.e., with a trust weight value of zero) that are likely to make future estimates incorrect from the phase and frequency offset error computation and the block noise covariance matrix computation, as may observed below.

4. Compute phase and frequency offset error (Step 506 of FIG. 5)
   a. Compute frequency offset error $$\delta\omega_k \leftarrow -\frac{b}{2a} - \frac{\sqrt{b^2 - 4ac}}{2a}$$

where
   $a \triangleq \operatorname{Re} \sum_{n=-L}^{+L} 3n^3 \rho_{k,n} r_{k,n}^- (h_{k,n}^-)^* \alpha_3$
   $b \triangleq \operatorname{Re} \sum_{n=-L}^{+L} 2n^2 \rho_{k,n} r_{k,n}^- (h_{k,n}^-)^* \alpha_2$ -continued ALGORITHM 2 - Forward Phase and Frequency Offset Tracking $$c \triangleq \text{Re} \sum_{n=-L}^{+L} n\, \rho_{k,n}\, r_{k,n}^{-}(h_{k,n}^{-})^{*}\, \alpha_{1}$$

$$\alpha_{1} \triangleq \frac{15}{2} j\omega_{MAX}^{-2}(-21\omega_{MAX}^{-3}\sin\omega_{MAX} + 21\omega_{MAX}^{-2}\cos\omega_{MAX} + 8\omega_{MAX}^{-1}\sin\omega_{MAX} - \cos\omega_{MAX})$$

$$\alpha_{2} \triangleq \frac{15}{2} \omega_{MAX}^{-3}(-3\omega_{MAX}^{-2}\sin\omega_{MAX} + 3\omega_{MAX}^{-1}\cos\omega_{MAX} + \sin\omega_{MAX})$$

$$\alpha_{3} \triangleq \frac{35}{2} j\omega_{MAX}^{-4}(-15\omega_{MAX}^{-3}\sin\omega_{MAX} - 15\omega_{MAX}^{-2}\cos\omega_{MAX} - 6\omega_{MAX}^{-1}\sin\omega_{MAX} + \cos\omega_{MAX})$$

b. Compute phase offset error $$\delta\theta_{k} \leftarrow \arg\left(\sum_{n=-L}^{+L} \rho_{k,n} r_{k,n}^{-}(h_{k,n}^{-})^{*} e^{-j(\delta\omega_{k})n}\right)$$

c. Define error matrix as $$e_{k} \triangleq \begin{bmatrix} \delta\theta_{k} \\ \delta\omega_{k} \end{bmatrix}$$

5. Compute block noise covariance matrix (Step 508 of FIG. 5)

$$P_{k} = \begin{bmatrix} \dfrac{\sum_{n=-L}^{L} \rho_{k,n}|r_{k,n}^{-} - h_{k,n}^{-}|^{2}}{2\sum_{n=-L}^{L} \rho_{k,n}|k_{k,n}^{-}|^{2}} & 0 \\ 0 & \dfrac{\sum_{n=-L}^{L} |r_{k,n}^{-} - h_{k,n}^{-}|^{2}}{2(2L+1)\sum_{n=-L}^{L} \rho_{k,n}|h_{k,n}^{-}|^{2}} \end{bmatrix}$$

Computation of the block noise covariance matrix in a live manner such as described here may be more reactive when the carrier frequency is deviating significantly over time and therefore perform frequency tracking more effectively than a conventional system that employs a static block noise covariance matrix.

6. Predict block noise covariance matrix, $P_{k}^{-}$ from $P_{k-1}$ (Step 508 of FIG. 5)
   $P_{k}^{-} = FP_{k-1}F^{T}$
7. Compute Kalman Gain matrix (Step 508 of FIG. 5)
   $G_{k} = P_{k}^{-}(P_{k}^{-} + R)^{-1}$
8. Perform posterior estimation of the phase and frequency offsets for the $k^{th}$ block (Step 508 of FIG. 5):
   $x_{k} \leftarrow x_{k}^{-} + G_{k}e_{k}$

END

The third stage 406, pre-processing for reverse phase and frequency offset tracking, processes the symbols for reverse tracking. The third stage 406 is described in pseudocode below as Algorithm 3.

ALGORITHM 3 - Pre-processing for Reverse Phase and Frequency Offset Tracking

Inputs:
1. $k^{th}$ block of received noisy QAM symbols: $r_{k,-L}, \ldots, r_{k,0}, \ldots r_{k,+L}$ : $k \geq 1$, where $K + 1$ is the total number of received blocks.

2. Phase and frequency offset estimates for the $K^{th}$ block of symbols, $x_{k} = \begin{bmatrix} \theta_{K} \\ \omega_{K} \end{bmatrix}$ 3. Noise covariance matrix of $K^{th}$ block, $P_{K}$ Outputs:
1. Initial coarse estimates of carrier phase and frequency offsets, $x_{0} = \begin{bmatrix} \theta_{0} \\ \omega_{0} \end{bmatrix}$ 2. Noise covariance matrix for the first block, $P_{0}$

BEGIN

| ALGORITHM 3 - Pre-processing for Reverse Phase and Frequency Offset Tracking |
| --- |
| 1. Reverse the order of received symbols.<br>$r_{k,n} \leftarrow r_{K-k,-n}$<br>2. Compute the initial phase and frequency offset estimate for reverse processing.<br>$$x_0 \leftarrow \begin{bmatrix} \theta_K \\ -\omega_K \end{bmatrix}$$<br>3. Compute the noise covariance matrix $P_0$ for reverse processing.<br>$P_0 \leftarrow P_K$<br>END |

The last stage 408, reverse phase and frequency offset tracking, processes the symbols in the reverse direction. The fourth stage 408 is described in pseudocode below as Algorithm 4.

to estimate and then correct for the frequency offset. This step also returns any residual phase offset remaining in the block of symbols after processing in step 1.

| ALGORITHM 4 - Reverse Phase and Frequency Offset Tracking |
| --- |
| Inputs:<br>1. $k^{th}$ block of received noisy QAM symbols: $r_{k,-L}, \ldots, r_{k,0}, \ldots r_{k,+L}$ : $k \geq 1$<br>2. Initial coarse estimates of carrier phase and frequency offsets, $x_0 = \begin{bmatrix} \theta_0 \\ \omega_0 \end{bmatrix}$<br>3. Covariance Matrix R<br>4. Noise covariance matrix for the first block, $P_0$<br>5. Hard decision trust threshold, $\Gamma \in [-\infty, 0]$<br>Outputs:<br>1. Transmitted clean symbol block $s_{k,n}$ corresponding to $r_{k,n}$<br>BEGIN<br>1. Run steps 1 to 8 of Algorithm 2.<br>2. Posterior correction on the non-overlapping symbols in the $k^{th}$ block (Step 512 of FIG. 5), using the estimated phase and frequency offset values, followed by hard decision.<br>$s_{k,n} = H(r_{k,n} \exp -j(\theta_k + n\omega_k))$ : $n \in [-(V-1), V-1]$<br>END |

Derivations of certain aspects of the algorithms described above are now presented.

Derivation 1—Phase and Frequency Offsets Estimation and Correction on the Zeroth Block of Received QAM Symbols Step 3. Improve the phase offset estimate by adding the coarse phase offset estimate obtained in step 1 and the residual phase offset obtained in step 2.

The details of steps 1, 2 and 3 are now described.

Inputs:
1. $0^{th}$ block of 2L + 1 received noisy M-QAM symbols: $r_{0,-L}, \ldots, r_{0,0}, \ldots r_{0,+L}$
2. Theoretical maximum phase offset range for error free hard decision on a QAM symbol assuming no frequency offset: $(-\theta_{MAX}, \theta_{MAX})$
3. Theoretical maximum frequency offset range assuming no phase offset: $(-\omega_{MAX}, \omega_{MAX})$ where $\omega_{MAX} = \dfrac{\theta_{MAX}}{L}$ 4. Actual maximum frequency offset range assuming no phase offset: $(-f \times \omega_{MAX}, f \times \omega_{MAX})$ : $f \in (0, 1)$ Outputs: Initial coarse estimates of carrier phase and frequency offsets, $x_0 = \begin{bmatrix} \theta_0 \\ \omega_0 \end{bmatrix}$ Derivation Outline:

Step 1. Estimate and apply a coarse phase offset on the received symbol block such that a hard decision on the symbols in the block after coarse phase offset correction is error free.

Step 2. Use the coarse phase offset corrected received symbols and the corresponding hard decision symbols Step 1: Coarse Phase Offset Estimation and Correction Since the transmit QAM constellation has a square geometry, the range of coarse phase offset to be estimated reduces from [−180°, +180°] to [−45°, +45°].

The true phase offset can be any real number in the continuum between −45° to +45°. However, at this step the goal is not to estimate the true phase offset. A coarse phase estimate that results in error free hard decision suffices. This motivates conversion of the continuum $[-45°, +45°]$ into a set of discrete values, with a common step size, $\Delta\theta$, as shown in FIG. 8A, and as expressed here:

$$\theta(i) \triangleq -45° + \Delta\theta \times i : i \in \{0,1,2,\ldots,i_{LAST}\}, \theta(i) \in [-45°, +45°]$$

Figure 8:
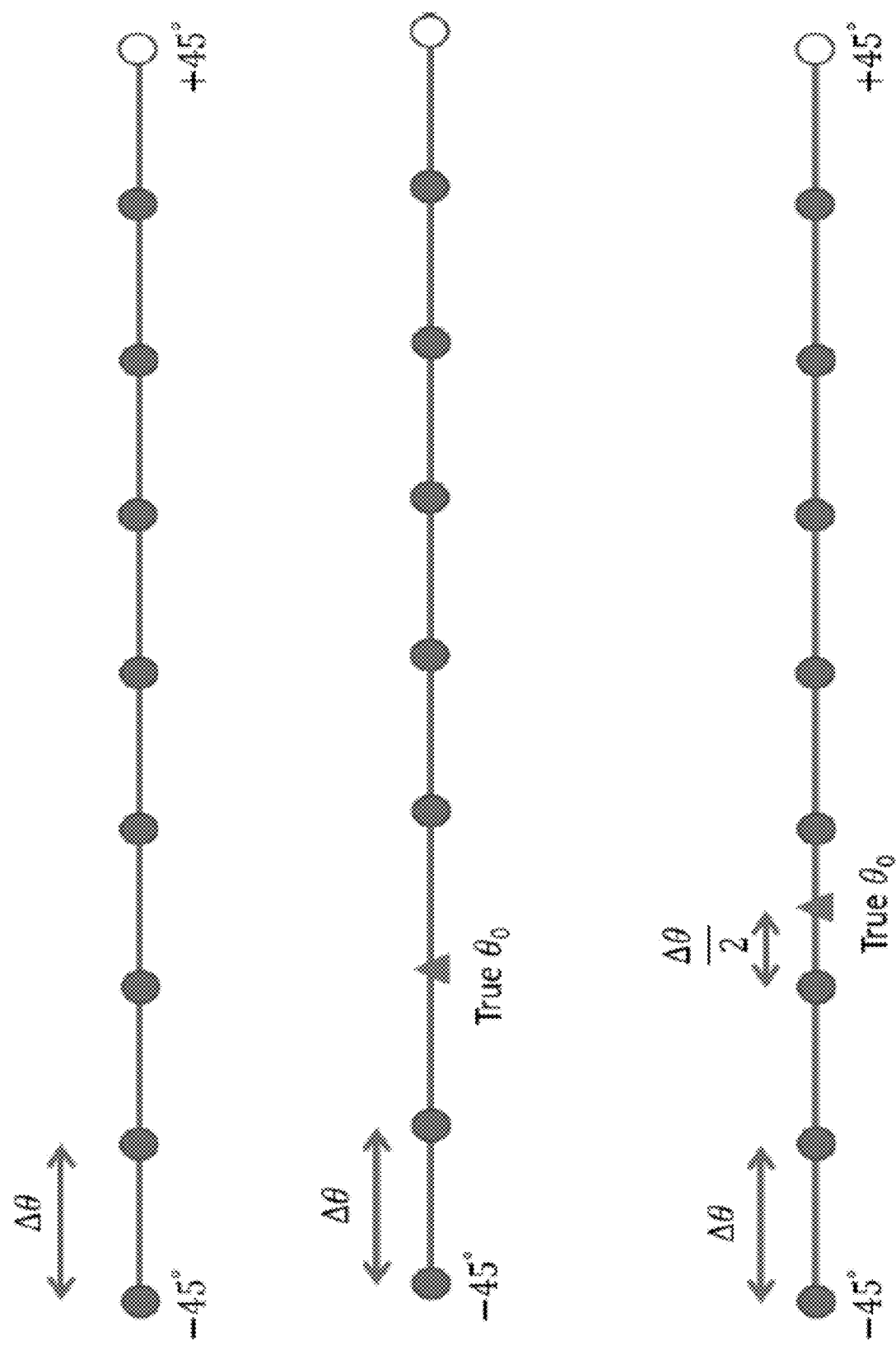
FIGS. 8A, 8B and 8C, referred to collectively as FIG. 8, are diagrams illustrating phase offset search space discretization in the zeroth block of received QAM symbols and zero error and maximum error scenarios.

Referring now to FIGS. 8A, 8B and 8C, referred to collectively as FIG. 8, diagrams are shown illustrating phase offset search space discretization in the zeroth block of received QAM symbols and zero error and maximum error scenarios. FIG. 8 includes three number lines, or phase grids, in which the value of the phase offset may vary between −45 degrees and +45 degrees. As shown in FIG. 8A, the search space for the phase offset in the zeroth block of received QAM symbols is discretized with a step size of $\Delta\theta$. In FIG. 8B, which illustrates the best-case scenario, the true phase offset of the zeroth block of received QAM symbols is exactly equal to one of the discretized phase values in the discrete set $\theta(i)$ having a range $[-45°, 45°]$, as shown. This results in zero error in the estimated value of the true phase offset. That is, the estimated phase has no error. On the other hand, the worst-case scenario is that the true phase offset lies half-way between two consecutive discrete phases in the range $[-45°, 45°]$, say $\theta(i)$ and $\theta(i+1)$, as shown in FIG. 8C. In this case, the phase error is half of the step size, $\Delta\theta/2$, which is the maximum possible error in the estimated value of the true phase offset. Therefore, the choice of $\Delta\theta$ should be such that even the worst-case phase estimation error results in an error free hard decision of the symbols.

The maximum supported frequency offset $$f \times \omega_{MAX} \equiv f \times \frac{\theta_{MAX}}{L}$$

implies that with a maximum residual phase offset error of $\Delta\theta/2$, the phase of the last symbol in the block is $$\frac{\Delta\theta}{2} + L \times \left(f \times \frac{\theta_{MAX}}{L}\right) = \frac{\Delta\theta}{2} + f \times \theta_{MAX}.$$

For error free hard decisions, the phase needs to be less than the maximum supported phase offset, $\theta_{MAX}$ as listed in Table 1, as expressed here:

$$\frac{\Delta\theta}{2} + f \times \theta_{MAX} < \theta_{MAX}$$

This leads to the condition imposed on the selected phase grid step size, as expressed here:

$$\Delta\theta < 2(1-f)\theta_{MAX}$$

The coarse phase offset estimate is then obtained as described in Steps 3 and 4 of Algorithm 1, which are reproduced here.

Compute a figure of merit, $g(i)$, for all candidate phase values $\theta(i)$ as follows:
FOR All $i \in \{0, 1, 2, \ldots, i_{LAST}\}$
Apply phase $-\theta(i)$ to all symbols in the block: $r_{0,n} \leftarrow r_{0,n} e^{-j\theta_0} : n \in [-L, +L]$
Apply hard decision: $H(r_{0,n}) = h_n(i) : n \in [-L, +L]$ Compute RMS error metric:

$$g(i) = \sqrt{\frac{\sum_{n=-L}^{+L} |r_{0,n} - h_n(i)|^2}{2L+1}}$$

END FOR
Initial phase estimate is the candidate phase with minimum RMS Error: $\theta_0 \leftarrow \theta(l): g(l) = \min \{g(i)\}_{i=0}^{i_{LAST}}$ Step 2: Correct the received symbols for the estimated phase offset estimate $\theta_0$ obtained in Step 1 above to get:

$$r_{0,n} \leftarrow r_{0,n} e^{-j\theta_0} : n \in [-L, +L]$$

Apply hard decision on the resultant symbols and obtained resultant clean symbols as follows:

$$H(r_{0,n}) = h_n : n \in [-L, +L]$$

The phase corrected received symbols $r_{0,n}$ and corresponding hard decision symbols $h_n$ are used to compute the frequency offset and residual phase offset as described in Algorithm 1 (Steps 6 and 7) reproduced below. The derivation of these estimates is a special case of Derivation 2 with Hard Decision Trust Weights $\rho_{0,n}$ set to 1 for all symbols in the block.

Frequency offset estimate for the zeroth block of symbols is:

$$\omega_0 \leftarrow -\frac{b}{2a} - \frac{\sqrt{b^2 - 4ac}}{2a}$$

where $$a \triangleq Re \sum_{n=-L}^{+L} 3n^3 r_{0,n} h_n^* \alpha_3,$$

$$b \triangleq Re \sum_{n=-L}^{+L} 2n^2 r_{0,n} h_n^* \alpha_2,$$

$$c \triangleq Re \sum_{n=-L}^{+L} n r_{0,n} h_n^* \alpha_1$$

$$\alpha_1 \triangleq \frac{15}{2} j\omega_{MAX}^{-2}(-21\omega_{MAX}^{-3} \sin\omega_{MAX} + 21\omega_{MAX}^{-2} \cos\omega_{MAX} + 8\omega_{MAX}^{-1} \sin\omega_{MAX} - \cos\omega_{MAX})$$

$$\alpha_2 \triangleq \frac{15}{2} \omega_{MAX}^{-3}(-3\omega_{MAX}^{-2} \sin\omega_{MAX} + 3\omega_{MAX}^{-1} \cos\omega_{MAX} + \sin\omega_{MAX})$$

$$\alpha_3 \triangleq \frac{35}{2} j\omega_{MAX}^{-4}(-15\omega_{MAX}^{-3} \sin\omega_{MAX} - 15\omega_{MAX}^{-2} \cos\omega_{MAX} - 6\omega_{MAX}^{-1} \sin\omega_{MAX} + \cos\omega_{MAX})$$

Residual phase offset estimate for the zeroth block is: $\arg(\Sigma_{n=-L}^{+L} r_{0,n} h_n^* e^{-j\omega_0 n})$ Step 3: Return the corrected phase offset estimate for the zeroth block as the sum of the coarse phase offset estimate from Step 1 and the residual phase offset estimate from Step 2 above.

$$\theta_0 \leftarrow \theta_0 + \arg\left(\sum_{n=-L}^{+L} r_{0,n} h_n^* e^{-j\omega_0 n}\right)$$

Derivation 2—Cubic Polynomial Approximation of the Complex Exponential

This section derives the expressions for the coefficients of the cubic polynomial approximation of the complex exponential $e^{-j\omega}$ in the domain $\omega \in [-\omega_0, +\omega_0]$ for a given parameter $\omega_0 > 0$. Note that the letters in boldface denote vectors and upper-case letters in boldface denote matrices.

Start with the approximation equation:

$$\exp{-j\omega} = \alpha_0 + \alpha_1\omega + \alpha_2\omega^2 + \alpha_3\omega^3 + h(\omega) = w^T\alpha + h(\omega)$$

where $\omega \in [-\omega_0, +\omega_0]$ is the domain of approximation, $h(\omega)$ is the approximation error, $\alpha_{m \in [0,3]}$ are the unknown coefficients of the cubic polynomial, $\alpha \triangleq [\alpha_0\ \alpha_1\alpha_2\ \alpha_3]^T$ and $w \triangleq [1\ \omega\ \omega^2\ \omega^3]^T$.

Optimal coefficients minimize the energy of the approximation error $h(\omega)$ integrated over the domain $[-\omega_0, +\omega_0]$.

$$\Lambda\alpha \triangleq \frac{1}{2\omega_0}\int_{-\omega_0}^{+\omega_0}\|h(\omega)\|^2 d\omega = \frac{1}{2\omega_0}\int_{-\omega_0}^{+\omega_0}\|e^{-j\omega} - w^T\alpha\|^2 d\omega =$$

$$\frac{1}{2\omega_0}\int_{-\omega_0}^{+\omega_0}(1 + \alpha^H w w^T\alpha - e^{j\omega}w^T\alpha - e^{-j\omega}\alpha^H w)d\omega$$

$$\alpha_{OPTIMAL} \triangleq \arg\min_\alpha \Lambda(\alpha)$$

To find the $\alpha$ that minimizes the cost function $\Lambda(\alpha)$, find the gradient vector of $\Lambda(\alpha)$ with respect to $\alpha$ and set that equal to the zero vector.

$$\nabla_\alpha \Lambda(\alpha) = \frac{1}{2\omega_0}\int_{-\omega_0}^{+\omega_0}\nabla_\alpha(1 + \alpha^H w w^T\alpha - e^{j\omega}w^T\alpha - e^{-j\omega}\alpha^H w)d\omega =$$

$$\frac{1}{2\omega_0}\int_{-\omega_0}^{+\omega_0}(0 + W\alpha - 0 - e^{-j\omega}w)d\omega = 0$$

where, $$W \triangleq \begin{bmatrix} 1 & \omega & \omega^2 & \omega^3 \\ \omega & \omega^2 & \omega^3 & \omega^4 \\ \omega^2 & \omega^3 & \omega^4 & \omega^5 \\ \omega^3 & \omega^4 & \omega^5 & \omega^6 \end{bmatrix}$$

Thus, $$\int_{-\omega_0}^{+\omega_0} W\alpha\, d\omega = \int_{-\omega_0}^{+\omega_0} e^{-j\omega} w\, d\omega$$

Integrate and expand the matrices and vectors to get:

$$\begin{bmatrix} \omega_0 & 0 & \omega_0^3/3 & 0 \\ 0 & \omega_0^3/3 & 0 & \omega_0^5/5 \\ \omega_0^3/3 & 0 & \omega_0^5/5 & 0 \\ 0 & \omega_0^5/5 & 0 & \omega_0^7/7 \end{bmatrix}\begin{bmatrix} \alpha_0 \\ \alpha_1 \\ \alpha_2 \\ \alpha_3 \end{bmatrix} =$$

$$\begin{bmatrix} \sin\omega_0 \\ j(\omega_0\cos\omega_0 - \sin\omega_0) \\ 2\omega_0\cos\omega_0 + (\omega_0^2 - 2)\sin\omega_0 \\ j\{(\omega_0^3 - 6\omega_0)\cos\omega_0 + (-3\omega_0^2 + 6)\sin\omega_0\} \end{bmatrix}$$

Or $$\begin{bmatrix} \alpha_0 \\ \alpha_1 \\ \alpha_2 \\ \alpha_3 \end{bmatrix} = \begin{bmatrix} \omega_0 & 0 & \omega_0^3/3 & 0 \\ 0 & \omega_0^3/3 & 0 & \omega_0^5/5 \\ \omega_0^3/3 & 0 & \omega_0^5/5 & 0 \\ 0 & \omega_0^5/5 & 0 & \omega_0^7/7 \end{bmatrix}^{-1}$$

$$\begin{bmatrix} \sin\omega_0 \\ j(\omega_0\cos\omega_0 - \sin\omega_0) \\ 2\omega_0\cos\omega_0 + (\omega_0^2 - 2)\sin\omega_0 \\ j\{(\omega_0^3 - 6\omega_0)\cos\omega_0 + (-3\omega_0^2 + 6)\sin\omega_0\} \end{bmatrix}$$

which yields the desired optimal coefficients of the cubic polynomial that approximates the complex exponential:

$$\alpha_0 \leftarrow \frac{3}{2}\omega_0^{-1}(-\sin\omega_0 - 5\omega_0^{-1}\cos\omega_0 + 5\omega_0^{-2}\sin\omega_0)$$

$$\alpha_1 \leftarrow \frac{15}{2}j\omega_0^{-2}(-21\omega_0^{-3}\sin\omega_0 + 21\omega_0^{-2}\cos\omega_0 + 8\omega_0^{-1}\sin\omega_0 - \cos\omega_0)$$

$$\alpha_2 \leftarrow \frac{15}{2}\omega_0^{-3}(-3\omega_0^{-2}\sin\omega_0 + 3\omega_0^{-1}\cos\omega_0 + \sin\omega_0)$$

$$\alpha_3 \leftarrow \frac{35}{2}j\omega_0^{-4}(-15\omega_0^{-3}\sin\omega_0 - 15\omega_0^{-2}\cos\omega_0 - 6\omega_0^{-1}\sin\omega_0 + \cos\omega_0)$$

Table 2 above lists, as an example, values of the coefficients produced by the described cubic polynomial approximation embodiment for different M-QAM constellations with block size of 17, i.e., L=8.

Figure 7:
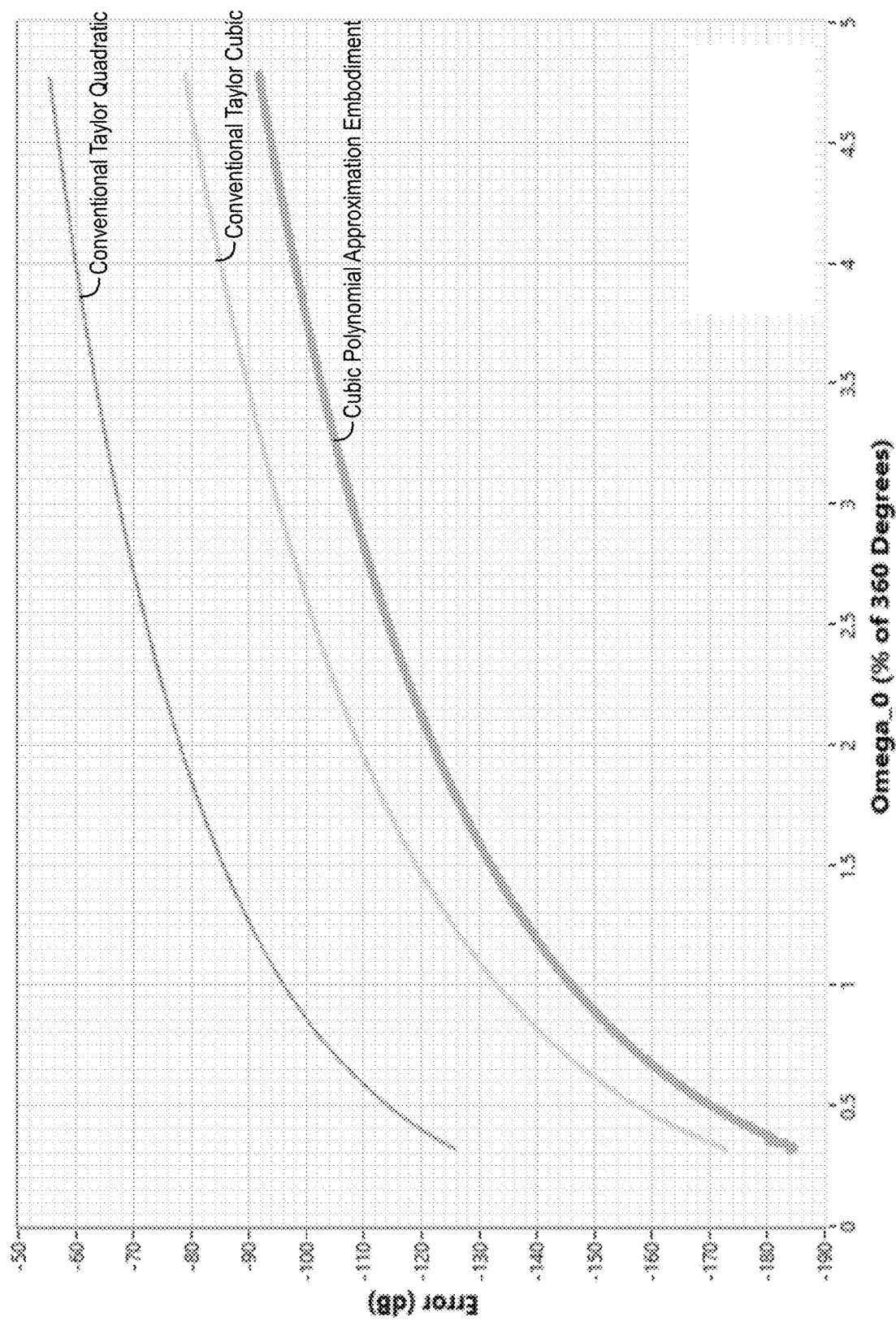
FIG. 7 is a graph illustrating a comparison of approximation error of the complex exponential when using the coefficients produced by the described cubic polynomial approximation embodiments versus using the conventional quadratic and third order Taylor series approximations.

Referring now to FIG. 7, a graph illustrating a comparison of approximation error of the complex exponential when using the coefficients produced by the described cubic polynomial approximation embodiments (e.g., described with respect to Derivation 2) versus using the conventional quadratic and third order Taylor series approximations is shown. The conventional Taylor quadratic approximation is expressed as $e^{-j\omega} \approx 1 - j\omega - 0.5\omega^2$. The conventional Taylor cubic approximation is expressed as $$e^{-j\omega} \approx 1 - j\omega - \frac{\omega^2}{2} + \frac{j\omega^3}{6}.$$

In contrast, the cubic polynomial approximation according to embodiments described herein is expressed as $e^{-j\omega} \approx \alpha_0 + \alpha_1\omega + \alpha_2\omega^2 + \alpha_3\omega^3$, and expressions for the coefficients are described above with respect to Algorithm 1 and Derivation 2. With respect to FIG. 7, approximation error is specified as:

$$\text{Error (dB)} \triangleq 20\log\left[\sqrt{\frac{1}{2\omega_0}\int_{-\omega_0}^{+\omega_0}\|e^{-j\omega} - f(\omega)\|^2 d\omega}\right]$$

where $e^{-j\omega}$ is the complex exponential to be approximated, $f(\omega)$ is the chosen polynomial approximation function, and $[-\omega_0, +\omega_0]$ is the domain of approximation, where $\omega_0(\%) \triangleq \omega_0$ (degrees)×100/360.

Derivation 3—Phase and Frequency Offset Error Estimates for Blocks of Symbols Past the Zeroth Block This section derives the expressions for the phase and frequency offset errors used in Algorithm 2. The expressions are reproduced below:

Frequency Offset Error:

$$\delta\omega_k \leftarrow -\frac{b}{2a} - \frac{\sqrt{b^2 - 4ac}}{2a}$$

where $$a \triangleq Re\sum_{n=-L}^{+L} 3n^3 \rho_{k,n} r^-_{k,n}(h^-_{k,n})^* \alpha_3$$

$$b \triangleq Re\sum_{n=-L}^{+L} 2n^2 \rho_{k,n} r^-_{k,n}(h^-_{k,n})^* \alpha_2$$

$$c \triangleq Re\sum_{n=-L}^{+L} n\rho_{k,n} r^-_{k,n}(h^-_{k,n})^* \alpha_1$$

$$\alpha_1 \triangleq \frac{15}{2} j\omega_{MAX}^{-2}(-21\omega_{MAX}^{-3}\sin\omega_{MAX} + 21\omega_{MAX}^{-2}\cos\omega_{MAX} + 8\omega_{MAX}^{-1}\sin\omega_{MAX} - \cos\omega_{MAX})$$

$$\alpha_2 \triangleq \frac{15}{2} \omega_{MAX}^{-3}(-3\omega_{MAX}^{-2}\sin\omega_{MAX} + 3\omega_{MAX}^{-1}\cos\omega_{MAX}\sin\omega_{MAX})$$

$$\alpha_3 \triangleq \frac{35}{2} j\omega_{MAX}^{-4}(-15\omega_{MAX}^{-3}\sin\omega_{MAX} - 15\omega_{MAX}^{-2}\cos\omega_{MAX} - 6\omega_{MAX}^{-1}\sin\omega_{MAX} + \cos\omega_{MAX})$$

Phase Offset Error:

$$\delta\theta_k \leftarrow \arg\left(\sum_{n=-L}^{+L} \rho_{k,n} r^-_{k,n}(h^-_{k,n})^* e^{-j(\delta\omega_k)n}\right)$$

Refer to Algorithm 2 for the definitions of the terms appearing in these expressions.

Start by defining the cost function that must be minimized by selecting appropriate values for the phase offset error and frequency offset error.

$$\Lambda_{min}(\delta\omega_k, \delta\theta_k; \rho) \triangleq \sum_{n=-L}^{+L} \rho_{k,n}|r^-_{k,n}\exp-j(\delta\theta_k + n\delta\omega_k) - h^-_{k,n}|^2 =$$

$$\sum_{n=-L}^{+L} \rho_{k,n}(|r^-_{k,n}|^2 + |h^-_{k,n}|^2 - 2Re(r^-_{k,n} h^-_{k,n}\exp-j(\delta\theta_k + n\delta\omega_k)))$$

where $\rho$ is the "hard decision trust" vector, $[\rho_{-k,L} \ldots \rho_{k,+L}]^T : \rho_{k,n} \in \{0, 1\}$ Minimizing $\Lambda_{min}(\delta\omega_k, \delta\theta_k; \rho)$ by choosing appropriate $\delta\omega_k, \delta\theta_k$ is equivalent to minimizing $$\sum_{n=-L}^{+L} -2Re(\rho_{k,n} r^-_{k,n} h^-_{k,n}\exp-j(\delta\theta_k + n\delta\omega_k))$$

because $|r^-_{k,n}|^2 + |h^-_{k,n}|^2$ are independent of $\delta\omega_k, \delta\theta_k$.

Therefore, the task is the same as that of maximizing $$\Lambda_{max}(\delta\omega_k, \delta\theta_k; \rho) \triangleq \sum_{n=-L}^{+L} Re(\rho_{k,n} r^-_{k,n} h^-_{k,n}\exp-j(\delta\theta_k + n\delta\omega_k))$$

by choosing appropriate $\delta\omega_k, \delta\theta_k$.

Setting the partial derivative of $\Lambda_{max}(\delta\omega_k, \delta\theta_k; \rho)$ with respect to $\delta\omega_k$ yields:

$$\frac{\partial \Lambda_{max}(\delta\omega_k, \delta\theta_k, ;\rho)}{\partial(\delta\omega_k)}$$

$$= \sum_{n=-L}^{+L} Re\left(\rho_{k,n} r^-_{k,n} h^-_{k,n}\frac{\partial(\exp-j(\delta\theta_k + n\delta\omega_k))}{\partial(\delta\omega_k)}\right)$$

$$\cong \sum_{n=-L}^{+L} Re\left(\rho_{k,n} r^-_{k,n} h^-_{k,n}\frac{\partial(\alpha_0 + \alpha_1(\delta\theta_k + n\delta\omega_k) + \alpha_2(\delta\theta_k + n\delta\omega_k)^2 + \alpha_3(\delta\theta_k + n\delta\omega_k)^3)}{\partial(\delta\omega_k)}\right) = 0$$

The second expression uses the cubic polynomial approximation of the complex exponential. Simplify this further by ignoring all the terms that involve the product $\delta\theta_k\delta\omega_k$ or other higher order products of the phase offset error and frequency offset error.

Then $$\sum_{n=-L}^{+L} Re\left(\rho_{k,n} r^-_{k,n} h^-_{k,n}\frac{\partial(\alpha_0 + \alpha_1(\delta\theta_k + n\delta\omega_k) + \alpha_2(\delta\theta_k + n\delta\omega_k)^2 + \alpha_3(\delta\theta_k + n\delta\omega_k)^3)}{\partial(\delta\omega_k)}\right) = 0$$

is approximately the same as $$\sum_{n=-L}^{+L} Re\left(\rho_{k,n} r^-_{k,n} h^-_{k,n}\frac{\partial(\alpha_0 + \alpha_1(n\delta\omega_k) + \alpha_2(n\delta\omega_k)^2 + \alpha_3(n\delta\omega_k)^3)}{\partial(\delta\omega_k)}\right) = 0$$

This results in a quadratic equation in $\delta\omega_k$ which can be solved to yield two solutions. The solution for which the second derivative of $\Lambda_{max}(\delta\omega_k, \delta\theta_k; \rho)$ is negative is the estimate for the frequency offset error, and is given by:

$$\delta\omega_k \leftarrow -\frac{b}{2a} - \frac{\sqrt{b^2 - 4ac}}{2a}$$

where $$a \triangleq Re\sum_{n=-L}^{+L} 3n^3 \rho_{k,n} r^-_{k,n}(h^-_{k,n})^* \alpha_3$$

$$b \triangleq Re\sum_{n=-L}^{+L} 2n^2 \rho_{k,n} r^-_{k,n}(h^-_{k,n})^* \alpha_2$$

$$c \triangleq Re\sum_{n=-L}^{+L} n\rho_{k,n} r^-_{k,n}(h^-_{k,n})^* \alpha_1$$

Once the frequency offset error estimate is obtained, phase offset estimate error is computed as:

$$\delta\theta_k \leftarrow \arg\left(\sum_{n=-L}^{+L} \rho_{k,n} r_{k,n}^- (h_{k,n}^-)^* e^{-j(\delta\omega_k)n}\right)$$

The described carrier phase and frequency tracking system and method embodiments may enjoy the following advantages relative to conventional systems. First, the carrier phase and frequency tracking system may be more robust against random noise in received QAM modulated symbols. Second, the carrier phase and frequency tracking system may have a higher range of maximum frequency offset that can be tracked. Third, the carrier phase and frequency tracking system may acquire and maintain stable constellation lock, i.e., obtain a good initial coarse estimate of the phase and frequency offsets, in a fewer number of received QAM symbols. More specifically, embodiments described here may provide significant performance improvements over conventional systems, such as PLL-based carrier phase and frequency trackers, in terms of the ability to recover QAM symbols without error, the carrier frequency offset estimation bias in no-noise conditions and under noisy conditions with various signal to noise ratios (SNR), the standard deviation and the RMS error in the estimated carrier frequency offset under various SNR conditions for QAM signals with different constellation sizes, e.g., from M=4 to 4096.

Figure 9:
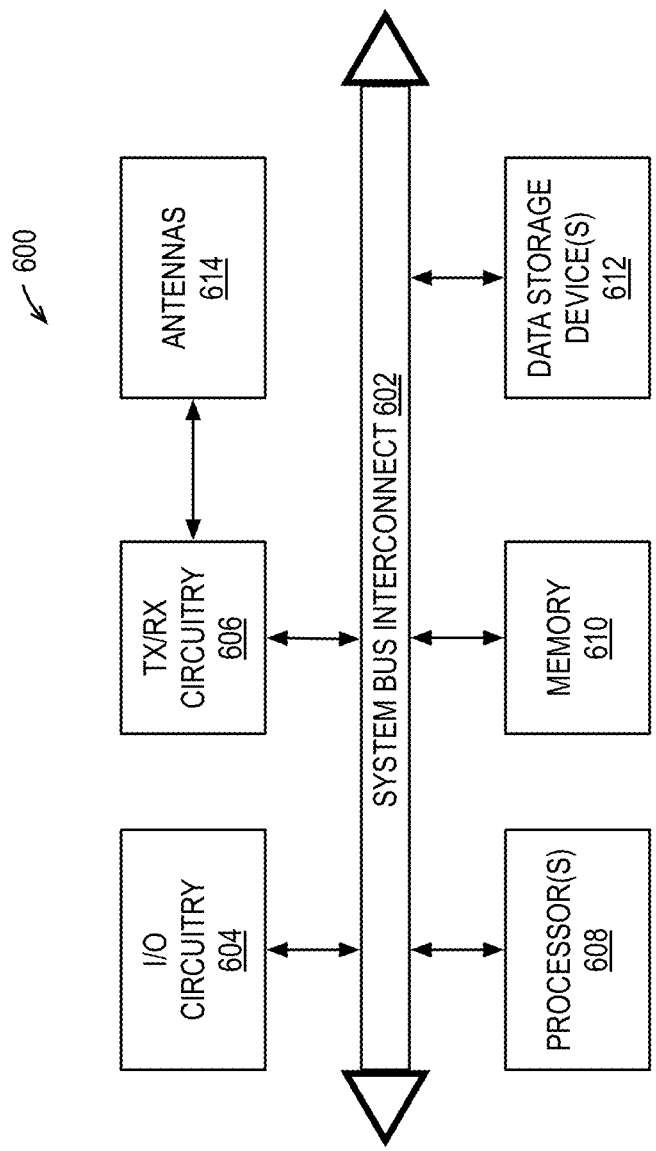
FIG. 9 is a block diagram of an example embodiment for electronic components that can be used to implement a user equipment device or base station including the functions and operational features described for performing carrier phase and frequency tracking for M-QAM demodulation.

Referring now to FIG. 9, a block diagram of an example embodiment for electronic components that can be used to implement a user equipment device or base station including the functions and operational features described for performing carrier phase and frequency tracking for M-QAM demodulation is shown. For the example embodiment 600 shown in FIG. 9, one or more processors 608 communicate with other components through system bus interconnect 602. For example, the one or more processors 608 communicate with input/output (I/O) circuitry 604 and transmit/receive (TX/RX) circuitry 606 through the system bus interconnect 602. Additional circuitry can also be included such as power supply circuitry and/or other desired circuitry. The TX/RX circuitry 606 provides one or more cellular radios that are coupled to one or more antennas 614 through which the TX/RX circuitry transmits and receives RF (radio frequency) signals. The antennas 614 may comprise multiple physical antenna elements to accomplish beamforming of transmit and receive beams. The antennas 614 may be controlled by the processors 608 and/or the TX/RX circuitry 606. The system 600 may perform transmit and receive beamforming in the digital domain, in the analog domain, or in a combination of the two using the antennas 614. The I/O circuitry 604 provides one or more interfaces for users, such as graphical user interfaces, and/or connections to peripheral devices (e.g., displays, keyboards, mice, point device, and/or other I/O peripheral devices). The memory 610 is also coupled to the system bus interconnect 602 and can be used by the one or more processors 608 to load and/or store instructions, data, and/or other information during operation, such as operations described with respect to FIG. 9 and the other Figures to accomplish carrier phase and frequency tracking for M-QAM demodulation. One or more data storage device(s) 612 are also connected to the system bus interconnect 602 and can store software or program instructions and/or other desired data or information for the operation of the processing system. For example, computer-readable instructions stored in the data storage devices 612 can be loaded within the memory 610 and then executed by the processor(s) 608 to carry out the described functions to accomplish carrier phase and frequency tracking for M-QAM demodulation.

It is noted that different and/or additional components from those depicted in FIG. 9 could also be used to implement one or more radio systems for the described embodiments while still taking advantage of the described techniques. It is further noted that the system bus interconnect 602 can be implemented as multiple interconnection buses with or without additional intervening circuitry such as routing or switching circuitry. Further, the processor(s) 608 can be implemented using one or more programmable integrated circuits including controllers, microcontrollers, microprocessors, hardware accelerators, configurable logic devices (e.g., field programmable gate arrays), and/or other programmable integrated circuits that are programmed to carry out the described functions. Further, the one or more processor(s) 608 can execute instructions stored in a non-transitory tangible computer-readable medium to perform the described functions. In addition, data storage device(s) 612 can be implemented as any desired non-transitory tangible medium that stores data, such as data storage devices, FLASH memory, random access memory, read only memory, programmable memory devices, reprogrammable storage devices, hard drives, floppy disks, DVDs, CD-ROMs, and/or any other non-transitory data storage mediums. The memory 610 can be any data storage medium configured to maintain data storage when powered. Other variations could may be implemented.

It is still further noted that the functional blocks, components, systems, devices, and/or circuitry described herein can be implemented using hardware, software, or a combination of hardware and software. For example, the disclosed embodiments can be implemented using one or more programmable integrated circuits that are programmed to perform the functions, tasks, methods, actions, and/or other operational features described herein for the disclosed embodiments. The one or more programmable integrated circuits can include, for example, one or more processors and/or PLDs (programmable logic devices). The one or more processors can be, for example, one or more central processing units (CPUs), controllers, microcontrollers, microprocessors, hardware accelerators, ASICs (application specific integrated circuit), and/or other integrated processing devices. The one or more PLDs can be, for example, one or more CPLDs (complex programmable logic devices), FPGAs (field programmable gate arrays), PLAs (programmable logic array), reconfigurable logic circuits, and/or other integrated logic devices. Further, the programmable integrated circuits, including the one or more processors, can be configured to execute software, firmware, code, and/or other program instructions that are embodied in one or more non-transitory tangible computer-readable mediums to perform the functions, tasks, methods, actions, and/or other operational features described herein for the disclosed embodiments. The programmable integrated circuits, including the one or more PLDs, can also be programmed using logic code, logic definitions, hardware description languages, configuration files, and/or other logic instructions that are embodied in one or more non-transitory tangible computer-readable mediums to perform the functions, tasks, methods, actions, and/or other operational features described herein for the disclosed embodiments. In addition, the one or more non-transitory tangible computer-readable mediums can include, for example, one or more data storage devices, memory devices, flash memories, random access memories, read only memories, programmable memory devices, reprogrammable storage devices, hard drives, floppy disks, DVDs, CD-ROMs, and/or any other non-transitory tangible computer-readable mediums. Other variations can also be implemented while still taking advantage of the new frame structures described herein.

Figure 10:
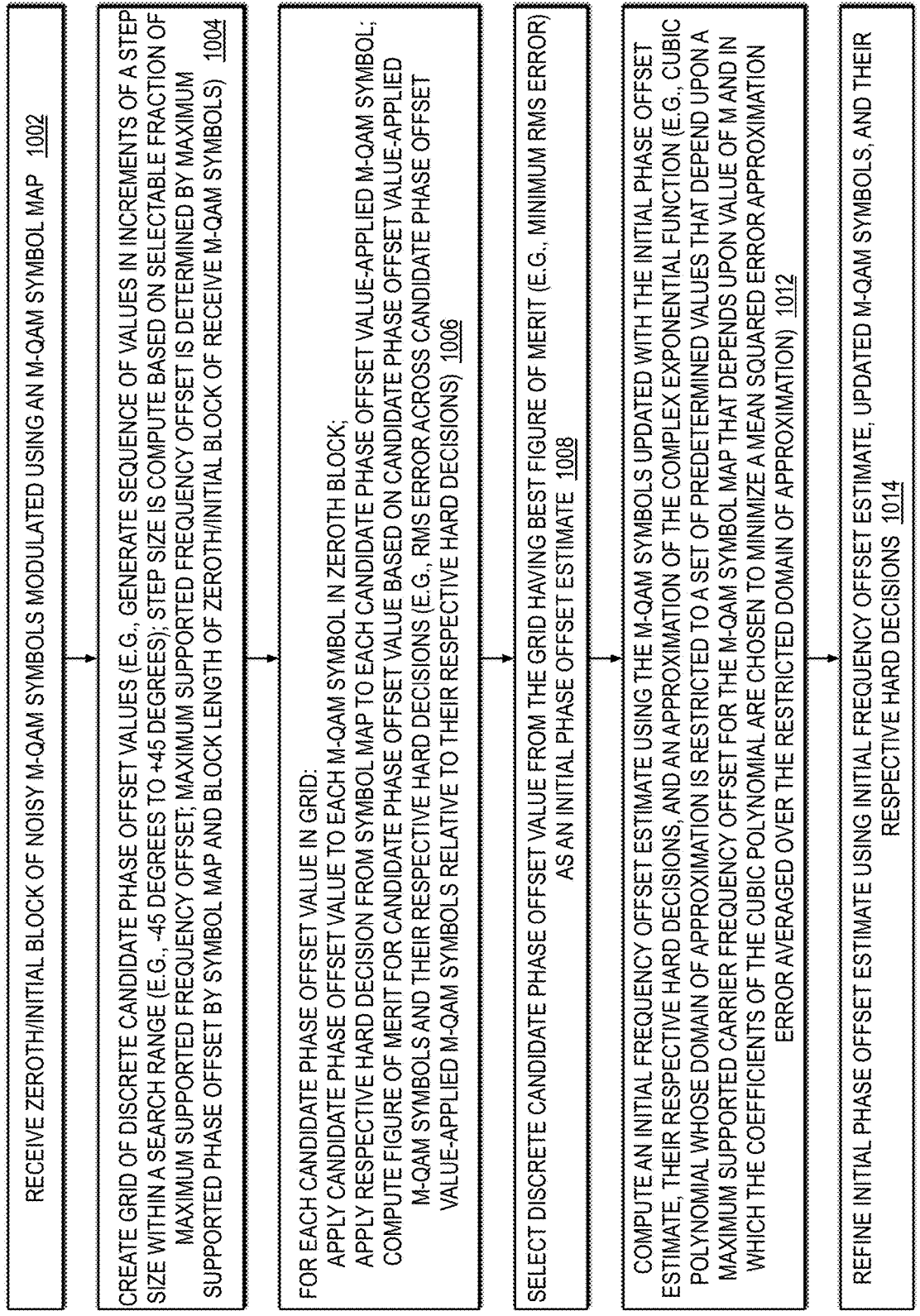
FIG. 10 is a flowchart illustrating a method for determining coarse carrier phase and frequency offsets of an initial block of received symbols modulated using an M-QAM symbol map.

Referring now to FIG. 10, a flowchart illustrating a method for determining coarse carrier phase and frequency offsets of an initial block of received symbols modulated using an M-QAM symbol map is shown. Operation begins at block 1002.

At block 1002, a receiver receives the zeroth/initial block of noisy M-QAM symbols modulated by a transmitter using an M-QAM symbol map (e.g., 4-QAM, 16-QAM, 256-QAM, etc.). Operation continues to block 1004.

At block 1004, a grid of discrete candidate phase offset values is created. The grid may be created by generating a sequence of values in increments of a step size within a search range, e.g., −45 degrees to +45 degrees. The step size may be computed based on a selectable fraction of a maximum supported frequency offset. The maximum supported frequency offset may be determined by a maximum supported phase offset for the M-QAM symbol map, e.g., as determinable from Table 1, and by the block length of the zeroth/initial block of M-QAM symbols. Operation continues to block 1006.

At block 1006, for each candidate phase offset value in the grid created at block 1004, the following is performed. First, the receiver applies the candidate phase offset value to each M-QAM symbol in the zeroth/initial block. Next, the receiver applies a respective hard decision from the symbol map to each of the M-QAM symbols to which the candidate phase offset value has been applied. Then, the receiver computes a figure of merit for the candidate phase offset value based on the M-QAM symbols to which the candidate phase offset value has been applied and their respective hard decisions. In one embodiment, the figure of merit is a root mean square (RMS) error across the M-QAM symbols to which the candidate phase offset value has been applied relative to their respective hard decisions. Operation continues to block 1008.

At block 1008, the receiver selects the discrete candidate phase offset value from the grid having the best figure of merit (e.g., minimum RMS error) as an initial phase offset estimate. Operation continues to block 1012.

At block 1012, the receiver computes an initial frequency offset estimate using the M-QAM symbols updated with the initial phase offset estimate, their respective hard decisions, and an approximation of the complex exponential function. In one embodiment, the approximation of the complex exponential function is a cubic polynomial whose domain of approximation is restricted to a set of predetermined values that depend upon a maximum supported carrier frequency offset for the M-QAM symbol map that depends upon the value of M and in which the coefficients of the cubic polynomial are chosen to minimize a mean squared error approximation error averaged over the restricted domain of approximation. Operation continues to block 1014.

At block 1014, the receiver refines the initial phase offset using the initial frequency offset estimate, the updated M-QAM symbols, and their respective hard decisions.

Figure 11:
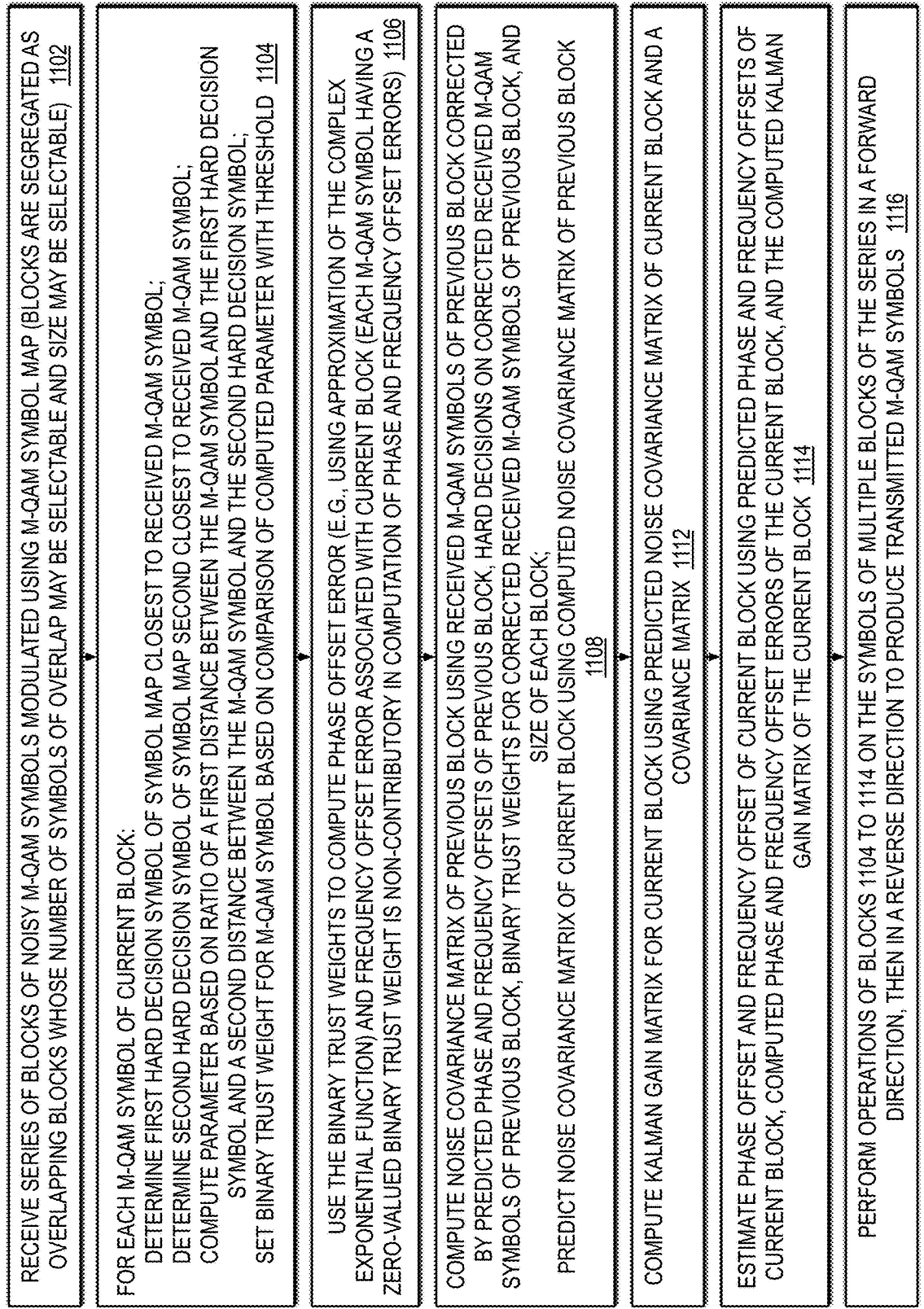
FIG. 11 is a flow diagram illustrating a flowchart illustrating a method for tracking carrier phase and frequency offsets associated with a series of blocks of received symbols modulated using an M-QAM symbol map.

Referring now to FIG. 11, a flowchart illustrating a method for tracking carrier phase and frequency offsets associated with a series of blocks of received symbols modulated using an M-QAM symbol map is shown. Operation begins at block 1102.

At block 1102, a receiver receives a series of blocks of noisy M-QAM symbols modulated by a transmitter using an M-QAM symbol map (e.g., 4-QAM, 16-QAM, 256-QAM, etc.). The blocks are segregated by the receiver as overlapping blocks of a particular size and having a number of symbols of overlap. The block size and number of symbols of overlap is selectable. Operation continues to block 1104.

At block 1104, for each M-QAM symbol of a current block, the following operations are performed by the receiver. First, the receiver determines a first hard decision symbol of the symbol map closest to the M-QAM symbol. Next, the receiver determines a second hard decision symbol of the symbol map second closest to the M-QAM symbol. Then, the receiver computes a parameter based on a ratio of first and second distances. The first distance is between the M-QAM symbol and the first hard decision symbol, and the second distance is between the M-QAM symbol and the second hard decision symbol. Finally, the receiver sets a binary trust weight for the M-QAM symbol based on a comparison of the computed parameter with a threshold. Operation continues to block 1106.

At block 1106, the receiver uses the binary trust weights to compute a phase offset error and a frequency offset error associated with the current block. The phase offset error may be computed using an approximation of the complex exponential function as described above, e.g., at block 1012. Each M-QAM symbol having a zero-valued binary trust weight does not contribute to the computation of the phase and frequency offset errors, e.g., because the binary trust weight is a multiplicative factor of a product, and the product is an addend of a summation. The computation of the frequency offset error also uses the received M-QAM symbols of the previous block corrected by predicted phase and frequency offsets of the previous block, hard decisions on the corrected received M-QAM symbols of the previous block, the binary trust weights for the corrected received M-QAM symbols of the previous block, and the block size. The computation of the phase offset error also uses the approximation of the complex exponential. Operation continues to block 1108.

At block 1108, the receiver computes a noise covariance matrix of the previous block using the received M-QAM symbols of the previous block corrected by predicted phase and frequency offsets of the previous block, hard decisions on the corrected received M-QAM symbols of the previous block, the binary trust weights for the corrected received M-QAM symbols of the previous block, and the block size. The receiver than predicts a noise covariance matrix of the current block using the computed noise covariance matrix of the previous block. Operation continues to block 1112.

At block 1112, the receiver computes the Kalman gain matrix for the current block using the predicted noise covariance matrix of the current block and a covariance matrix, e.g., covariance matrix R of Algorithm 2. Operation continues to block 1114.

At block 1114, the receiver estimates the phase offset and frequency offset of the current block using the predicted phase and frequency offsets of the current block, the computed phase and frequency offset errors of the current block, and the computed Kalman gain matrix of the current block. Operation continues to block 1116.

At block 1116, the receiver performs the operations of blocks 1104 to 1114 on the symbols of multiple blocks of the series in a forward direction, and then performs the operations of blocks 1104 to 1114 on the symbols of multiple blocks of the series in a reverse direction to produce transmitted M-QAM symbols.

Further modifications and alternative embodiments of this invention will be apparent to those skilled in the art in view of this description. It will be recognized, therefore, that the present invention is not limited by these example arrangements. Accordingly, this description is to be construed as illustrative only and is for teaching those skilled in the art the manner of carrying out the invention. It is to be understood that the forms of the invention herein shown and described are to be taken as present embodiments. Various changes may be made in the implementations and architectures. For example, equivalent elements may be substituted for those illustrated and described herein, and certain features of the invention may be utilized independently of the use of other features, all as would be apparent to one skilled in the art after having the benefit of this description of the invention.

The invention claimed is:

1. A method for tracking carrier phase and frequency offsets associated with a series of blocks of received symbols modulated using an M quadrature amplitude modulation (M-QAM) symbol map, comprising:
   determining coarse carrier phase and frequency offsets of an initial block of the series of blocks by:
      creating a grid of discrete candidate phase offset values;
      for each candidate phase offset value in the grid:
         applying the candidate phase offset value to each of the M-QAM symbols of the initial block;
         applying a respective hard decision from the symbol map to each of the candidate phase offset value-applied M-QAM symbols of the initial block; and
         computing a figure of merit for the candidate phase offset value based on the candidate phase offset value-applied M-QAM symbols of the initial block and their respective hard decisions;
      selecting the discrete candidate phase offset value from the grid having the best figure of merit as an initial phase offset estimate; and
      computing an initial frequency offset estimate using the M-QAM symbols of the initial block updated with the initial phase offset estimate, their respective hard decisions, and an approximation of the complex exponential function; and
   for each M-QAM symbol of a current block of the series of blocks subsequent to the initial block:
      setting a binary trust weight for the M-QAM symbol based on comparison of a computed parameter with a threshold, wherein each binary trust weight has a value of either zero or one; and
      using the binary trust weights to compute a phase offset error and a frequency offset error associated with the current block, wherein each of the M-QAM symbols having a zero-valued binary trust weight is non-contributory in the computation of the phase and frequency offset errors.

2. The method of claim 1,
   wherein said creating a grid of discrete candidate phase offset values comprises:
      generating a sequence of values in increments of a step size within a search range; and
   wherein the step size is computed based on a selectable fraction of a maximum supported frequency offset by the initial block of received M-QAM symbols.

3. The method of claim 2,
   wherein the maximum supported frequency offset by the initial block of received M-QAM symbols is determined by a maximum supported phase offset for the M-QAM symbol map and the block length of the initial block of received M-QAM symbols.

4. The method of claim 2,
   wherein the search range is −45 degrees to +45 degrees.

5. The method of claim 1,
   wherein said computing a figure of merit comprises:
      computing a root mean square (RMS) error across the candidate phase offset value-applied M-QAM symbols relative to their respective hard decisions; and
   wherein the best figure of merit comprises the minimum RMS error.

6. The method of claim 1, further comprising:
   refining the initial phase offset estimate using the initial frequency offset estimate, the updated M-QAM symbols, and their respective hard decisions.

7. The method of claim 1,
   wherein the approximation of the complex exponential function comprises a cubic polynomial;
   wherein a domain of approximation of the complex exponential function is restricted to a set of pre-determined values that depends upon a maximum supported carrier frequency offset for the M-QAM symbol map that depends upon the value of M; and
   wherein the coefficients of the cubic polynomial are chosen to minimize a mean squared approximation error averaged over the restricted domain of approximation.

8. The method of claim 1,
   wherein the initial phase and frequency offset estimates are made without reference to blocks of symbols previous in time to the initial block of received M-QAM symbols.

9. The method of claim 1, further comprising:
   for each M-QAM symbol of the current block, computing the parameter based on a first hard decision symbol of the symbol map closest to the received M-QAM symbol and a second hard decision symbol of the symbol map second closest to the M-QAM symbol.

10. The method of claim 9,
    wherein said computing the parameter is based on a ratio of:
       a first distance between the M-QAM symbol and the first hard decision symbol of the symbol map; and
       a second distance between the M-QAM symbol and the second hard decision symbol of the symbol map.

11. The method of claim 1, further comprising:
    prior to said using the binary trust weights to compute a phase offset error and a frequency offset error associated with the current block, computing a noise covariance matrix of the previous block using:
       received M-QAM symbols of the previous block corrected by predicted phase and frequency offsets of the previous block;
       hard decisions on the corrected received M-QAM symbols of the previous block;
       the binary trust weights for the corrected received M-QAM symbols of the previous block; and
       a size of each block; and
    predicting a noise covariance matrix of the current block using the computed noise covariance matrix of the previous block.

12. The method of claim 11, further comprising:
    computing a Kalman gain matrix for the current block using the predicted noise covariance matrix of the current block and a covariance matrix; and
    estimating the phase offset and a frequency offset of the current block using:
       predicted phase and frequency offsets of the current block;
       the computed phase and frequency offset errors of the current block; and
       the computed Kalman gain matrix of the current block.

13. The method of claim 1,
wherein the phase offset error is computed using an approximation of the complex exponential function;
wherein the approximation of the complex exponential function comprises a cubic polynomial;
wherein a domain of approximation of the complex exponential function is restricted to a set of pre-determined values that depends upon a maximum supported carrier frequency offset for the M-QAM symbol map that depends upon the value of M; and
wherein the coefficients of the cubic polynomial are chosen to minimize a mean squared approximation error averaged over the restricted domain of approximation.

14. The method of claim 1, further comprising:
performing the operations of claim 9 in a forward direction on received M-QAM symbols of a plurality of blocks of the series, followed by performing the operations of claim 9 in a reverse direction on the received M-QAM symbols of the plurality of blocks to produce transmitted M-QAM symbols for the received M-QAM symbols.

15. The method of claim 1,
wherein the blocks of the series are segregated into overlapping blocks; and
wherein a number of symbols of overlap between consecutive blocks is selectable.

16. The method of claim 1,
wherein a size of the blocks is selectable.

17. A non-transitory computer-readable medium having instructions stored thereon that when executed by a processor, cause the processor to perform operations of first and second methods, comprising:
the first method is for determining coarse carrier phase and frequency offsets of an initial block of a series of blocks of received symbols modulated using an M quadrature amplitude modulation (M-QAM) symbol map that includes the operations of:
creating a grid of discrete candidate phase offset values;
for each candidate phase offset value in the grid:
applying the candidate phase offset value to each of the M-QAM symbols;
applying a respective hard decision from the symbol map to each of the candidate phase offset value-applied M-QAM symbols; and
computing a figure of merit for the candidate phase offset value based on the candidate phase offset value-applied M-QAM symbols and their respective hard decisions;
selecting the discrete candidate phase offset value from the grid having the best figure of merit as an initial phase offset estimate; and
computing an initial frequency offset estimate using the M-QAM symbols updated with the initial phase offset estimate, their respective hard decisions, and an approximation of the complex exponential function; and
the second method is for tracking carrier phase and frequency offsets associated with subsequent blocks of the series of blocks after the initial block that includes the operations of:
for each M-QAM symbol of a current block of the subsequent blocks:
setting a binary trust weight for the M-QAM symbol based on comparison of a computed parameter with a threshold; and
using the binary trust weights to compute a phase offset error and a frequency offset error associated with the current block, wherein each of the M-QAM symbols having a zero-valued binary trust weight is non-contributory in the computation of the phase and frequency offset errors.

18. The non-transitory computer-readable medium of claim 17,
wherein said creating a grid of discrete candidate phase offset values comprises:
generating a sequence of values in increments of a step size within a search range; and
wherein the step size is computed based on a selectable fraction of a maximum supported frequency offset by the initial block of received M-QAM symbols.

19. The non-transitory computer-readable medium of claim 17, the operations further comprising:
for each M-QAM symbol of the current block, computing the parameter based on a first hard decision symbol of the symbol map closest to the received M-QAM symbol and a second hard decision symbol of the symbol map second closest to the M-QAM symbol.

20. A radio frequency device that tracks carrier phase and frequency offsets associated with a series of blocks of received symbols modulated using an M quadrature amplitude modulation (M-QAM) symbol map, comprising:
a processor configured to:
determine coarse carrier phase and frequency offsets of an initial block of the series of blocks by:
creating a grid of discrete candidate phase offset values;
for each candidate phase offset value in the grid:
applying the candidate phase offset value to each of the M-QAM symbols of the initial block;
applying a respective hard decision from the symbol map to each of the candidate phase offset value-applied M-QAM symbols of the initial block; and
computing a figure of merit for the candidate phase offset value based on the candidate phase offset value-applied M-QAM symbols of the initial block and their respective hard decisions;
selecting the discrete candidate phase offset value from the grid having the best figure of merit as an initial phase offset estimate; and
computing an initial frequency offset estimate using the M-QAM symbols of the initial block updated with the initial phase offset estimate, their respective hard decisions, and an approximation of the complex exponential function; and
for each M-QAM symbol of a current block of the series of blocks subsequent to the initial block:
set a binary trust weight for the M-QAM symbol based on comparison of a computed parameter with a threshold, wherein each binary trust weight has a value of either zero or one; and
use the binary trust weights to compute a phase offset error and a frequency offset error associated with the current block, wherein each of the M-QAM symbols having a zero-valued binary trust weight is non-contributory in the computation of the phase and frequency offset errors.

* * * * *